United States Patent [19]

Cochran

[11] Patent Number: 4,680,701
[45] Date of Patent: Jul. 14, 1987

[54] ASYNCHRONOUS HIGH SPEED PROCESSOR HAVING HIGH SPEED MEMORIES WITH DOMINO CIRCUITS CONTAINED THEREIN

[75] Inventor: Michael J. Cochran, Richardson, Tex.

[73] Assignee: Texas Instruments Incorporated, Dallas, Tex.

[21] Appl. No.: 598,946

[22] Filed: Apr. 11, 1984

[51] Int. Cl.[4] .................. G06F 15/00; B01F 15/02
[52] U.S. Cl. .................. 364/200; 365/194; 365/233
[58] Field of Search ... 364/200 MS File, 900 MS File; 365/194, 233

[56] References Cited

U.S. PATENT DOCUMENTS

| | | | |
|---|---|---|---|
| 3,566,153 | 2/1971 | Spencer, Jr. | 307/205 |
| 3,866,186 | 2/1975 | Suzuki | 340/173 |
| 3,919,695 | 11/1975 | Gooding | 364/200 |
| 4,031,379 | 6/1977 | Schwartz | 235/175 |
| 4,041,292 | 8/1977 | Kindell | 235/164 |
| 4,153,938 | 5/1979 | Ghest et al. | 364/760 |
| 4,238,833 | 12/1980 | Ghest et al. | 364/760 |
| 4,291,247 | 9/1981 | Cooper, Jr. et al. | 307/481 |
| 4,295,193 | 10/1981 | Pomerene | 364/200 |
| 4,314,333 | 2/1982 | Shibayama et al. | 364/200 |
| 4,425,633 | 1/1984 | Swain | 365/194 |
| 4,435,793 | 3/1984 | Ochii | 365/233 |
| 4,439,827 | 3/1984 | Wilkes | 364/200 |
| 4,462,074 | 7/1984 | Linde | 364/200 |
| 4,484,301 | 11/1984 | Borgerding | 364/760 |
| 4,496,965 | 1/1985 | Orcutt et al. | 357/70 |
| 4,501,977 | 2/1985 | Koike | 307/469 |
| 4,545,028 | 10/1985 | Ware | 364/760 |
| 4,546,446 | 10/1985 | Machida | 364/759 |
| 4,558,435 | 12/1985 | Hsieh | 365/203 |
| 4,611,133 | 9/1986 | Peterson et al. | 307/481 X |

OTHER PUBLICATIONS

D. A. Kluga, Clocked PLA with Dummy Circuit Forming Clock Pulse for Inter-Array Driver with Worst-Case Delay, IBM Technical Disclosure Bulletin, vol. 24, No. 6, Nov. 1981, p. 3703.

*Primary Examiner*—Archie E. Williams, Jr.
*Assistant Examiner*—Thomas C. Lee
*Attorney, Agent, or Firm*—Richard K. Robinson; James T. Comfort; Melvin Sharp

[57] ABSTRACT

A high speed processor has its speed enhanced through the use of an asynchronous operation and its arithmetic logic unit and memory circuits. The minimum possible delay time is implemented through the providing a completion pulse upon the completion of each operation and initiating a subsequent operation at the receipt of the completion pulse.

3 Claims, 26 Drawing Figures

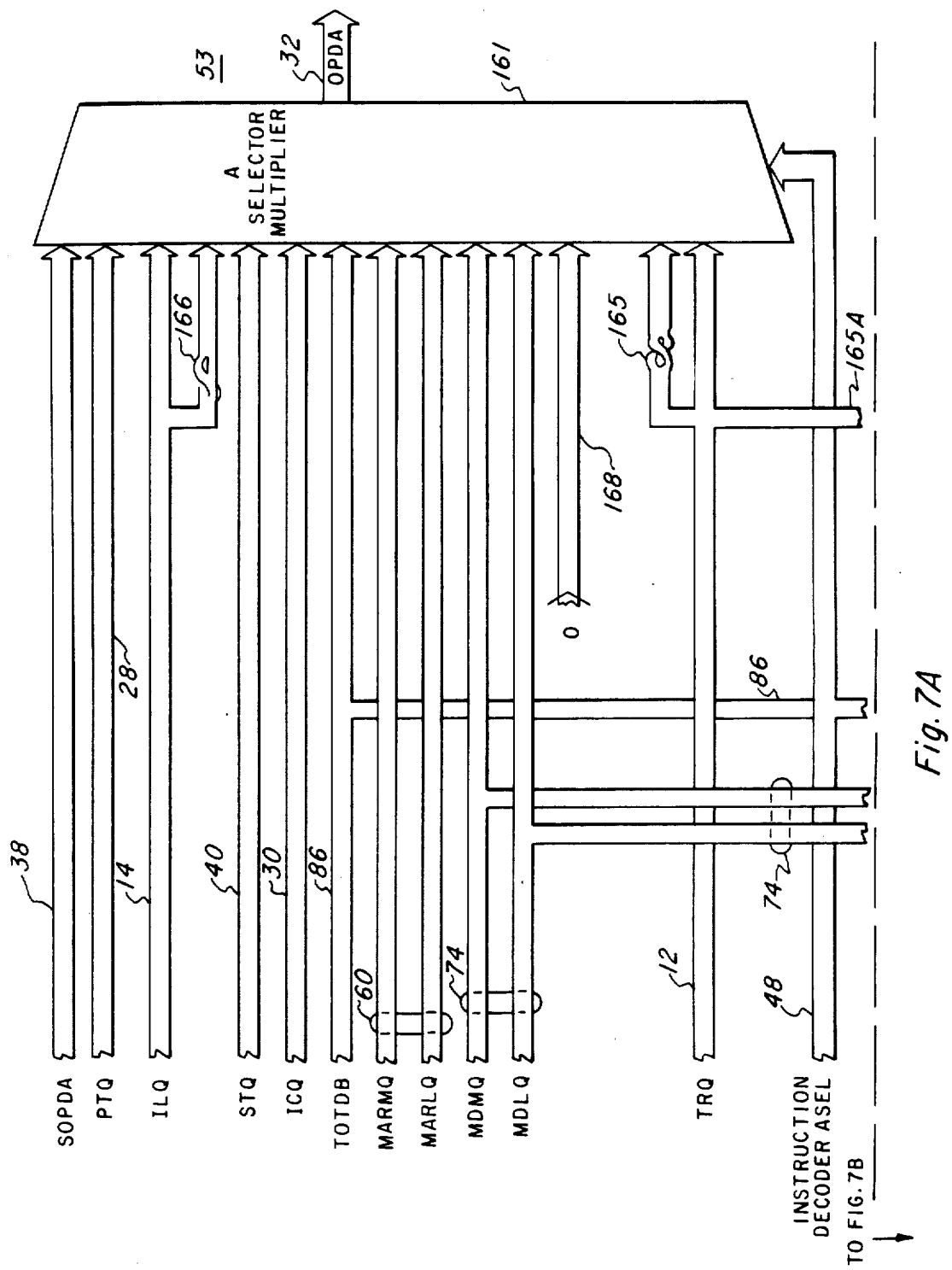

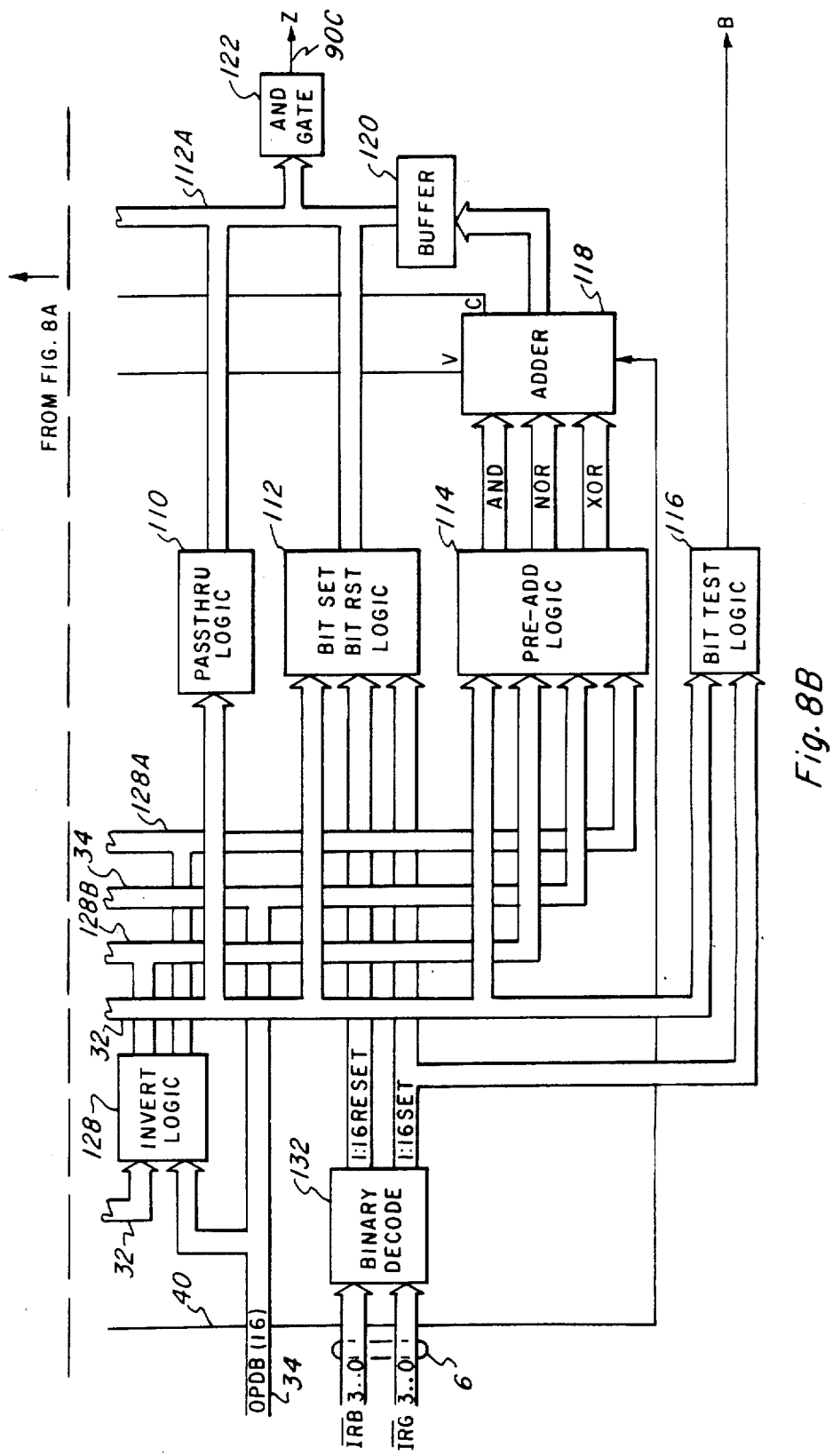

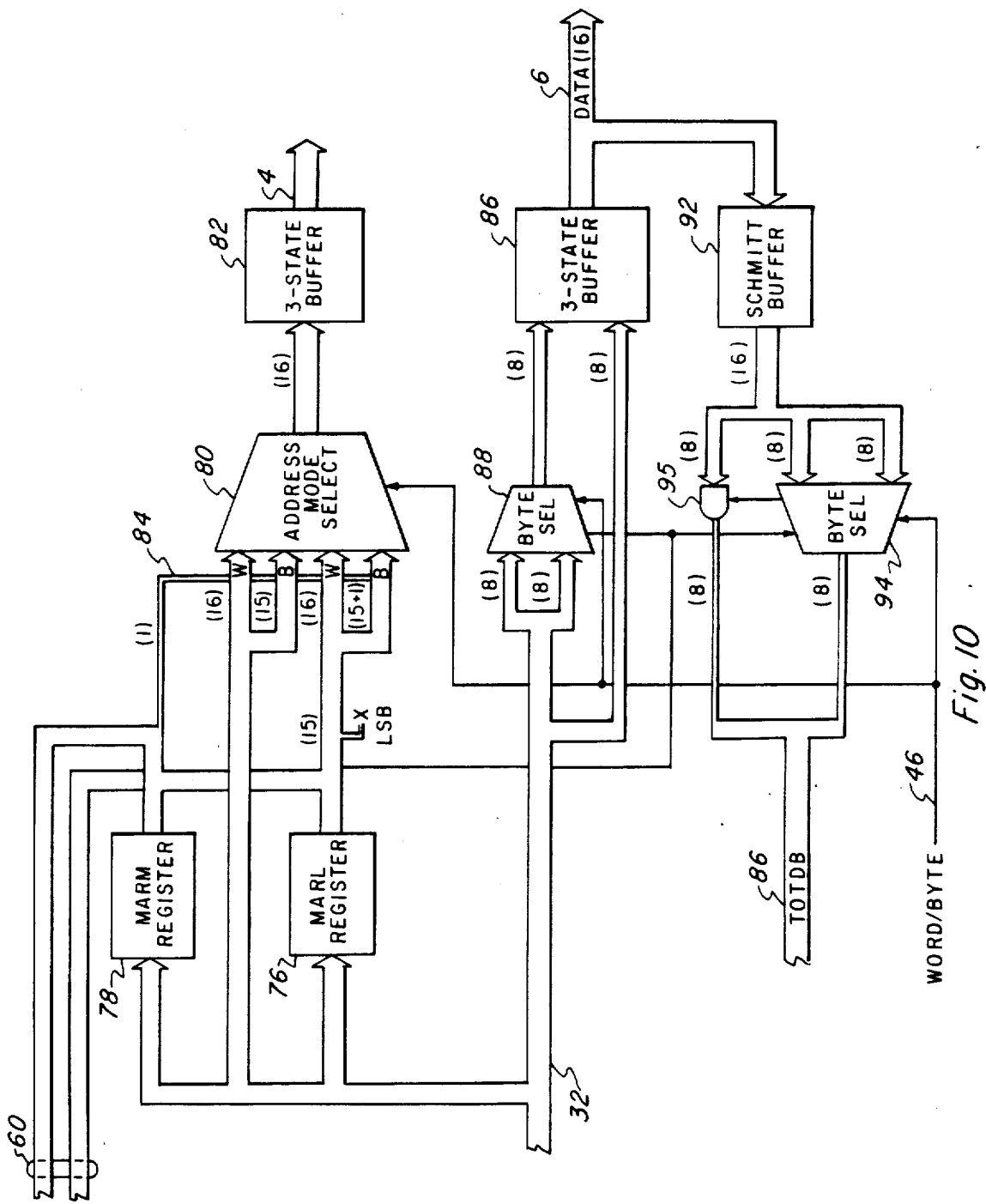

ASYNCHRONOUS HIGH SPEED PROCESSOR HAVING HIGH SPEED MEMORIES WITH DOMINO CIRCUITS CONTAINED THEREIN

RELATED APPLICATIONS

Related U.S. patent applications incorporated herein by reference and assigned to the Assignee of the present invention are Ser. No. 598,940, now abandoned, Ser. No. 598,941, Ser. No. 598,938, now abandoned, Ser. No. 598,939, now U.S. Pat. No. 4,654,786 and Ser. No. 599,911, now U.S. Pat. No. 4,562,537.

BACKGROUND OF THE INVENTION

This invention relates to data processors such as calculators, microcomputers, minicomputers, and large scale computers generally, and more particularly to high speed data processors. This invention relates to Ser. No. 520,880 filed 8/5/83, now abandoned, Ser. No. 538,634, filed 10/25/83, now U.S. Pat. No. 4,646,257.

Processing units, sometimes referred to as data processors, are very effective devices in the handling of menial and unimaginative tasks. These tasks typically require the monitoring of a physical phenomena or the brute force manipulation of data either in arithmatic or logical operation. The speed of the processing unit is determinative of its applicability and usefulness. Processors which are normally referred to as "slow", are generally unfeasible for certain tasks due to the time and/or cost restraints involved that result from the slow operation of a processing unit. Other processing units which are normally referred to as "fast" have traditionally been so expensive that they are impractical for certain applications.

Data processors are generally classified according to their size and ability. At the lowest end of the classification of the capability spectrum are the hand-held calculators which perform simple or routine operations; microcomputers are used in consumer and small business environments due to their moderate cost and somewhat slow computing speed; minicomputers have a larger memory and capability and are used in industrial, laboratory or in a medium business setting; and large scale computers range in size, depending on their specified task and typically handle large data bases and multiple users.

At the opposing ends of the classification spectrum, as discussed above, the hand-held calculators and giant computers, do not meet the demands or constraints of the average users. A balancing of cost points the average user to the micro or minicomputer which, because of the low cost, the user is willing to accept slow computing speeds.

The ability of a data processor to operate in a real time environment or mode is very advantageous. Real time operation allows task execution prioritizing which permits a higher priority task to be performed by interrupting a low priority task. To perform the higher priority task, the criteria and state of the lower priority task are temporarily placed in memory so that the data processing unit may, at a later date retrieve this data and continue the task where it was prematurely terminated. The amount of time that the data processor takes to dump the material associated with a lower priority task into a section of memory reserved for this purpose and then retrieve it determines if the use of the interrupts and change to a higher priority task is impractical. If a disproportional amount of time is devoted to dumping or retrieving data, obviously the efficiency of the processor suffers dramatically.

The architecture of a processing unit pertains to the various components parts of the processor and the interconnection between them. A data processor typically uses a Central Processing Unit (CPU) as the control means for the other component parts. The CPU is generally interfaced to or includes an Arithmetic Logic Unit (ALU).

The ALU is a device which accepts data and performs certain operations thereon. These operations are generally grouped as either arithmetic or logical in nature. The CPU controls the data delivered to and selects the operation of the ALU. One interface of a CPU to an ALU is illustrated in U.S. Pat. No. 3,761,698 issued Sept. 25, 1973.

The Arithmetic Logic Unit (ALU) performs an operation on the actual bit structure of the data so as to implement the desired function. Acceptance of data may be either sequential by bit, byte, data word and/or multiple or submultiple or above via a data buss. The data is stored within the CPU or alternatively in memory in the form of data words. The length of the data word is used to describe the data processor since the length is directly related to the precision of the data processor. A 16-bit data word processor has the capability of defining the number with much more precision than a four-bit data word processor.

The processor accepts data, manipulates it using an Arithmetic Logic Unit, and places it in an inactive state such as retaining it in a memory until the data is later needed. A communication channel electrically connects the CPU and the memory. Examples of the memory includes such devices as a Random Access Memory (RAM), a Read Only Memory (ROM), or a Magnetic Storage Device such as a magnetic tape or disk. An example of the interconnection between a processor and ROM or RAM is illustrated in U.S. Pat. No. 4,064,544 issued Sept. 20, 1977 to Tubbs.

The CPU responds to instruction storage as machine language. Machine language is instructions, coded into a word of the same length as the data word. The instructions are stored in the memory and are retrieved by the CPU according to locations code which may be a sequential location that are sequentially addressed by the CPU.

Since the memory contains both data and instructions for the processor, some flag or signal is used to keep the processor from confusing what it is receiving from the memory. A Von Neumann architecture provides for flagging of the data and instructions stored in memory. This arrangement allows the processor to perform tasks according to prioritization. When a high priority task interrupts a lower priority task, then the lower priority task operation is halted and the data in the processor and the status information relating to the lower task is stored in a memory until the higher priority task is completed. Once completed, the processor is set at the state where the lower priority task was interrupted.

The ability to dump data into memory and then to retrieve it at a later time is an important advantage for the data processor since multiple terminals or tasks are thereby serviced in line with their priority.

The structure of a memory into words, pages and chapters allows the processor more flexibility in its operation in that the data may be easily stored or retrieved through a word, page and chapter address.

Data processors generally act in conjunction with other data processors and exchange data and information to accomplish a particular goal. An example of such an application is U.S. Pat. No. 3,700,866 issued Oct. 24, 1972 to Taylor et al. In the Taylor patent cascading processors are used to achieve a minimum of uncertainty in the output signal. Typically a system of processors are arranged hierarchically so that data shifts through the lower levels to the higher level processors.

It should be noted, that the dimensions of Stephenson, Tubbs and Taylor, as referenced above, do not achieve a speed commensurate with the modern demands on a processing unit. Their basic handling of instructions, architecture structure and manipulation of data prevents them from achieving a high speed.

The time used by the processor to complete a single instruction, a single clock cycle, or the time between the rising edge of a single clock pulse to the rising edge of a falling clock pulse, is referred to as instruction or cycle time. Each device utilizes varying cycle times and sometimes it may take more than one cycle for a particularly involved operation to be performed.

In order to streamline or improve the cycle time on a processor, a method known as "look ahead" or "prefetch" has emerged. In a prefetched operation the next sequential instruction is obtained and decoded so that when the current instruction is completed, the next instruction is ready for operation. Since each instruction may be decoded prior to use, this technique eliminates the idle time experienced by the processor until that instruction is decoded by the processor. One such "look ahead" or "prefetch" method is described in U.S. Pat. No. 3,573,853 issued Apr. 6, 1971 to Watson et al.

To achieve prefetching, the appropriate timing of the instructions and data along the common bus must be maintained so as not to confuse the processor. Once the processor becomes confused as to whether it is receiving data or instructions, all further operations will only result in unintelligilble data being generated.

Prefetching alone, though, will not transform a "slow" processor into a "fast" processor which is defined as a processor with a cycle time of approximately 200 nano-seconds. Economical speed is the key. A low-cost, high-speed processor does not yet exist in the art; such a device will open new areas of application and permit the utilization of such a device in areas which are presently economically prohibitive and/or require great speed.

SUMMARY OF THE INVENTION

A high speed processor has its speed enhanced through the use of an asynchronous operation and its arithmetic logic unit and memory circuits. The minimum possible delay time is implemented through the providing of a completion pulse upon the completion of each operation and initiating a subsequent operation at the receipt of the completion pulse.

The high speed data processor obtains its speed through the efficient transfer of information over separate data and instruction busses, prefetching of instructions, dual working memory and architectural arrangements designed for maximum information transfer. The architecture of the data processor is such that data from any of several sources may be, either in combination or separately, channelled directly through an Arithmetic Logic Unit (ALU) so as to provide quick manipulation of the data since no extra iterations are needed in this movement. The processor uses two scratch pad or working memory areas. Both scratch pad memories communicate directly with the ALU so as to provide two operands, one from each memory and for the operation of the ALU. Two independent registers are provided which allow the linkage of computer words to obtain longer words thereby and a resulting higher precision. This linkage is accomplished by mapping and carrying the most significant bit over to the next sequentially mapped word. The invention also involves the use of a third independent register which may be directly channelled through the Arithmetic Logic Unit to set a memory address at a preselected value. This independent register is particularly useful in a real time mode of operation when the memory in the scratch pads must be dumped or temporarily stored in a nonvolatile memory so as to erase the scratch pad memory permitting a higher priority task to utilize it.

BRIEF DESCRIPTION OF THE FIGURES

The invention may be really understood from a reading of the description of the preferred embodiment incorporated with the drawings in which:

FIGS. 7A and 7B are a block diagram of the operand selector of FIG. 2;

FIGS. 8A and 8B are a block diagram of the Arithmetic Logic Unit of FIG. 2;

FIG. 10 is a block diagram of the Memory Address register of FIG. 2;

DETAILED DESCRIPTION OF THE PREFERRED EMBODIMENTS

Figure 1A:
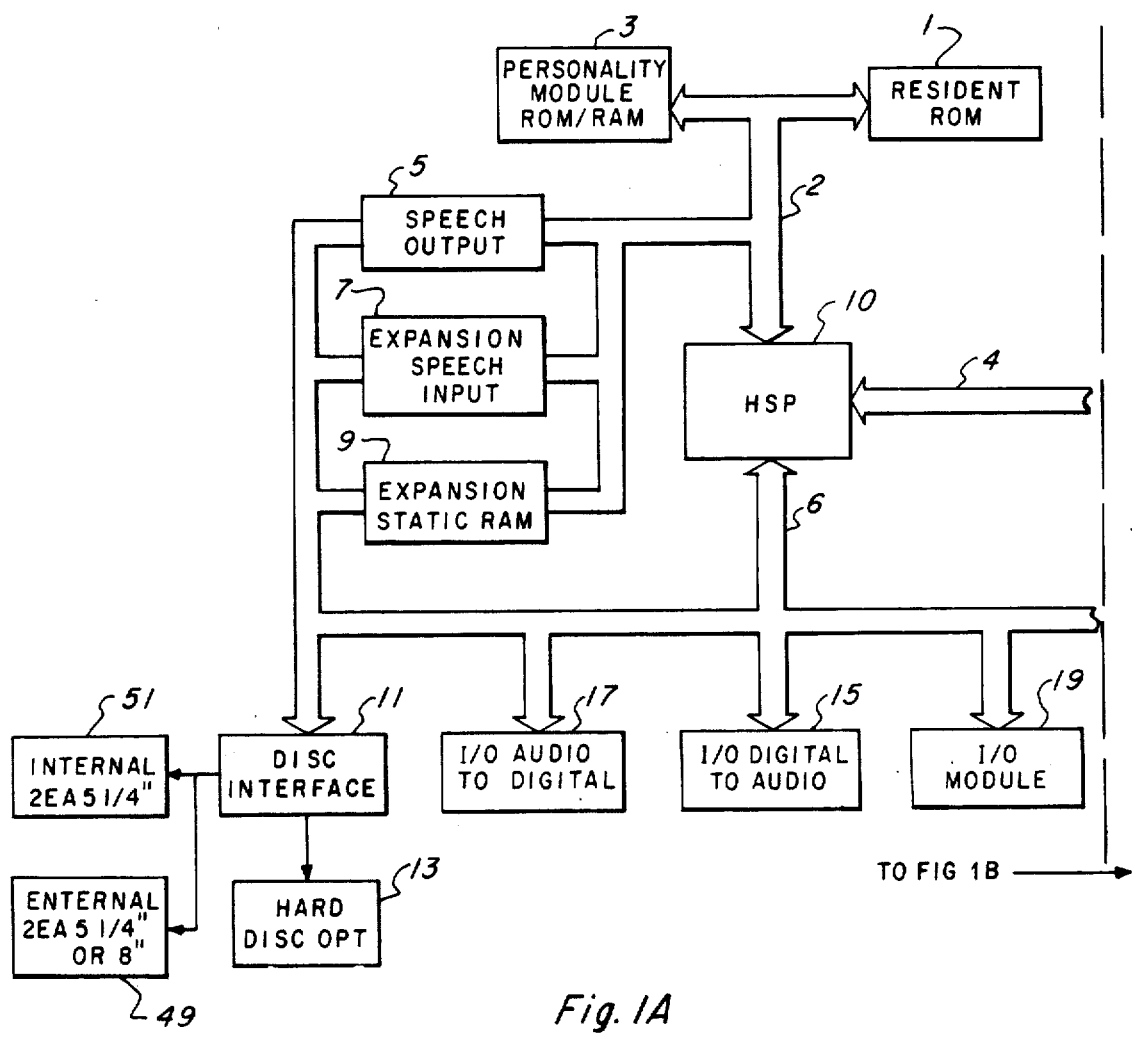
FIGS. 1A and 1B are a block diagram of a computing system utilizing the high speed processor of the invention.
Figure 1B:
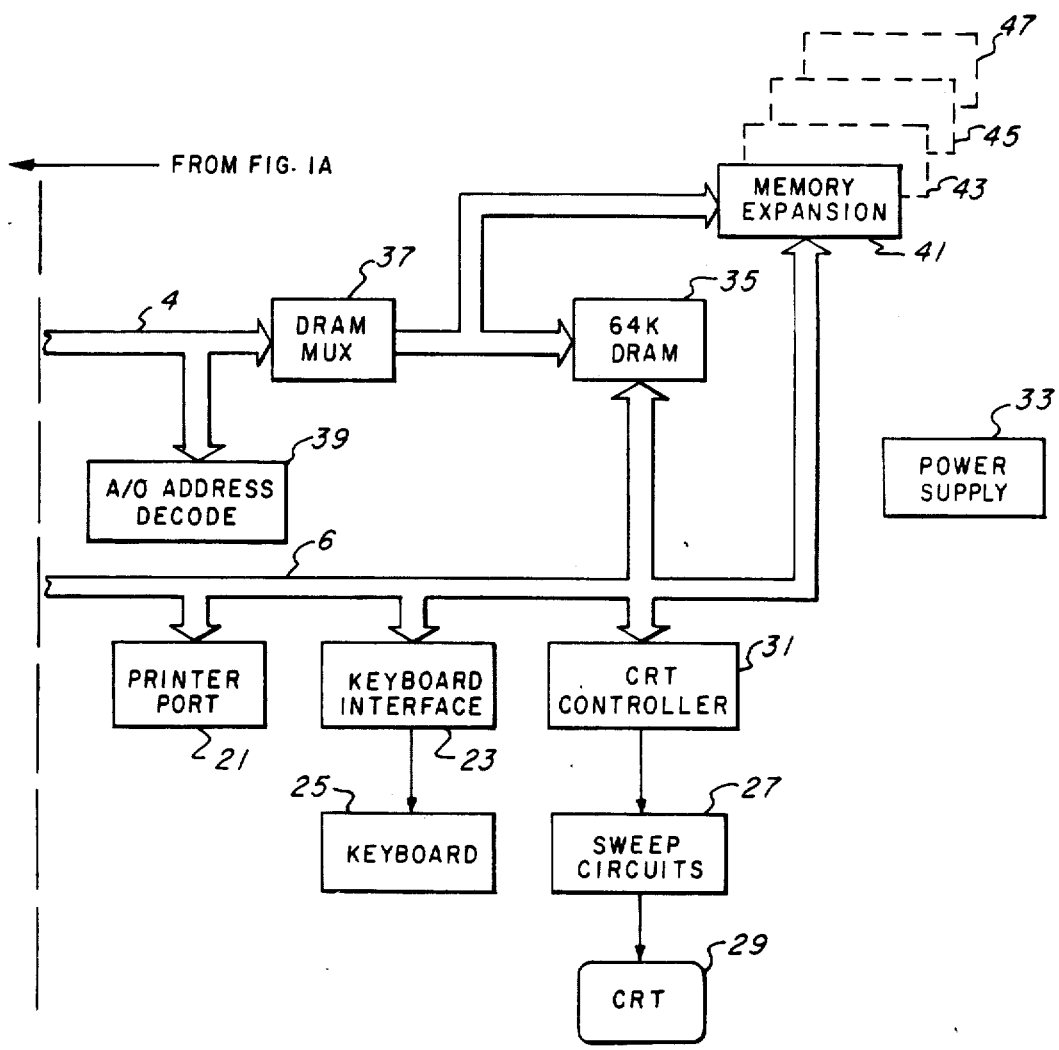

In FIG. 1, to which reference should now be made, there is shown a computer system 100 incorporating a high-speed processor 10 according to the invention. The high-speed processor 10 processes data from a data random access memory or "DRAM" which in the case of the embodiment of FIG. 1 is a 64 kiloword (16 bit) DRAM 35. There are provisions made for memory expansion through the addition of memory expansion modules 41, 43, 45, and 47. A memory multiplexer which in the embodiment of FIG. 1 is referred to as a DRAM mux 37, multiplexes the data to the high-speed processor 10 from either a 64K DRAM or one of a memory expansion modules 41, 43, 46 or 47. The high-speed processor 10 will process the data according to program instructions provided it by data bus 2 from one of the many program sources. A unique feature of the computing system 100 is not only the different means of storing of the instructions to operate on the data but the type of instructions available for operation on the data by the high-speed processor 10. A resident ROM 1 contains the core routine for the operation of the high-speed operation. However, the high-speed processor 10 may assume the personalities of other types of microprocessors through the modification of the core routine addressed in ROM with the contents of the personality module ROM/RAM which can be a ROM and RAM combination. The personality module ROM/RAM 3 will cause the high-speed processor 10 to look like a selected type of processor that is based upon the program that is contained within the personality module ROM/RAM 3. Additionally, as will be discussed later, the high-speed processor 10 is capable of accepting verbal commands and instructions and responding in a verbal manner. The software code for performing these verbal portion is contained within an expansion speech output module 5 and an expansion speech input module 7.

An expansion status RAM 9 provides other optional input/output capabilities to the high-speed processor 10 and to the programs or core routines stored within the personality module ROM/RAM 3 and the resident ROM 1. Data bus 6 is used to interface the input/output (I/O) modules ports to the high-speed processor 10, the memory units including the 64K DRAM 35 and the memory expansion modules 41, 43, 45 and 47 as well as to the expansion static RAM 9, the expansion speech input module 7 and the expansion speech output modules 5. The I/O ports or terminals include a disk interface unit 11 which connects to disk type memories for providing both program instructions and data to the high-speed processor 10.

In the embodiment shown in FIG. 1, the disk interconnect unit 11 is connected to a hard disk 13 as well as to two internals 5¼ inch disks 51 and to two external 8 inch disks 49. As was discussed earlier, the speech output module 5 is connected to an I/O module 15 which in the case of the embodiment of FIG. 1 is a digital-to-audio converter 15 which converts audio signals to digital signals which may be processed by the high-speed processor 10 in conjunction with the algorithms contained within the expansion speech output module 5. In a similar but obviously contrafashion, the I/O module 17 which in the embodiment of FIG. 1 is a digital to audio converter converts the digital signals that are applied thereto from the high-speed processor 10 which processes the digital signals in a manner dictated by the algorithms contained within the expansion speech input module 7. An optional I/O module 19 is provided which may, depending upon the application be used in conjunction with the algorithms contained within the expansion static RAM 9. Additionally, hard copies of the inputs and outputs to the high-speed processor 10 is provided to a printer, not shown, via a printer port 21. Manual entry to the high-speed processor 10 is provided via a keyboard 25 and a keyboard interface 23.

Visual display is provided to the operator through a CRT 29 which is controlled by a CRT controller 31 and the sweep circuits 27 which causes the CRT 29 to provide readable information via the CRT screen to an operator.

Figure 2A:
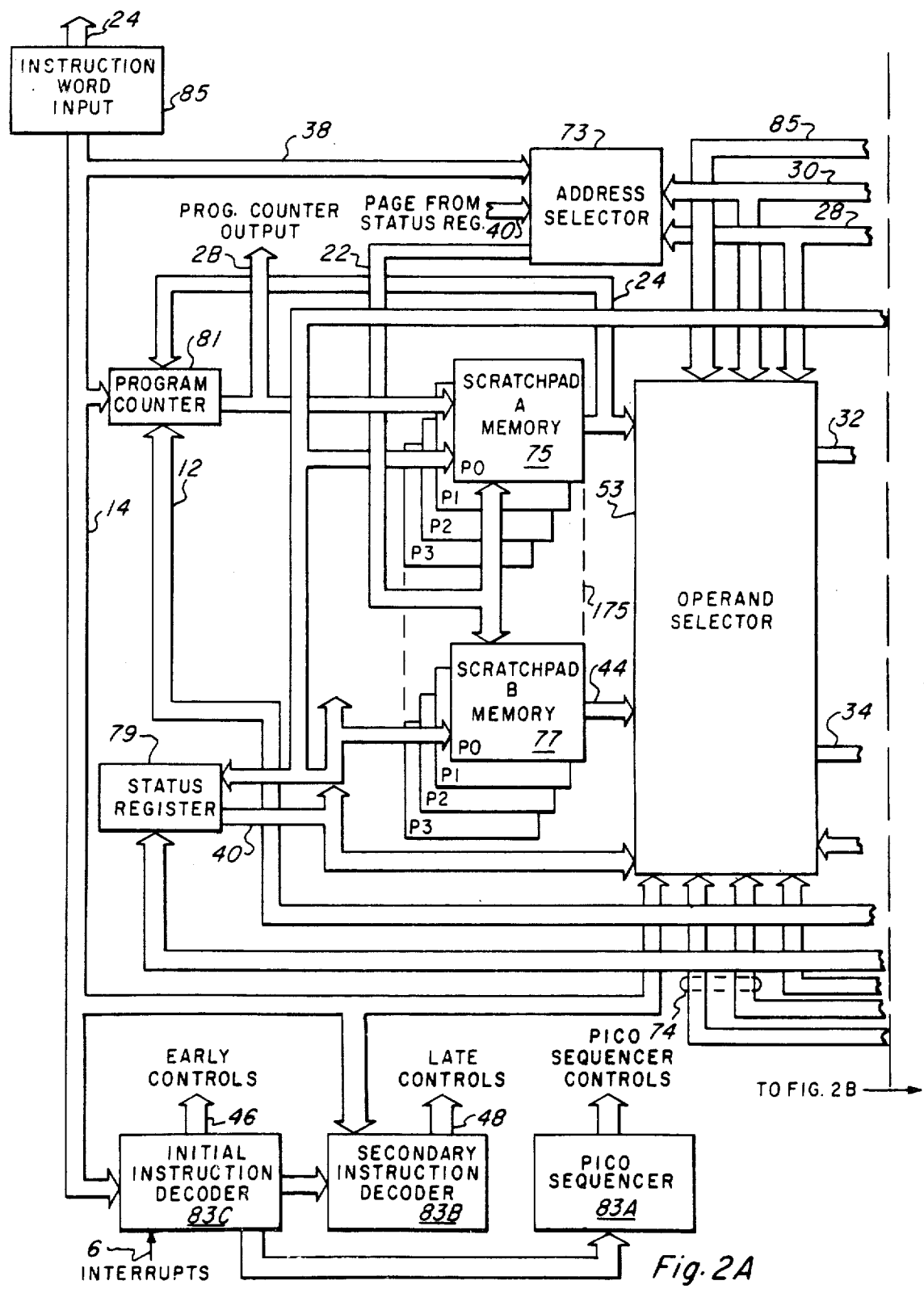
FIGS. 2A and 2B are a block diagram of the high speed processor according to the invention.
Figure 2B:
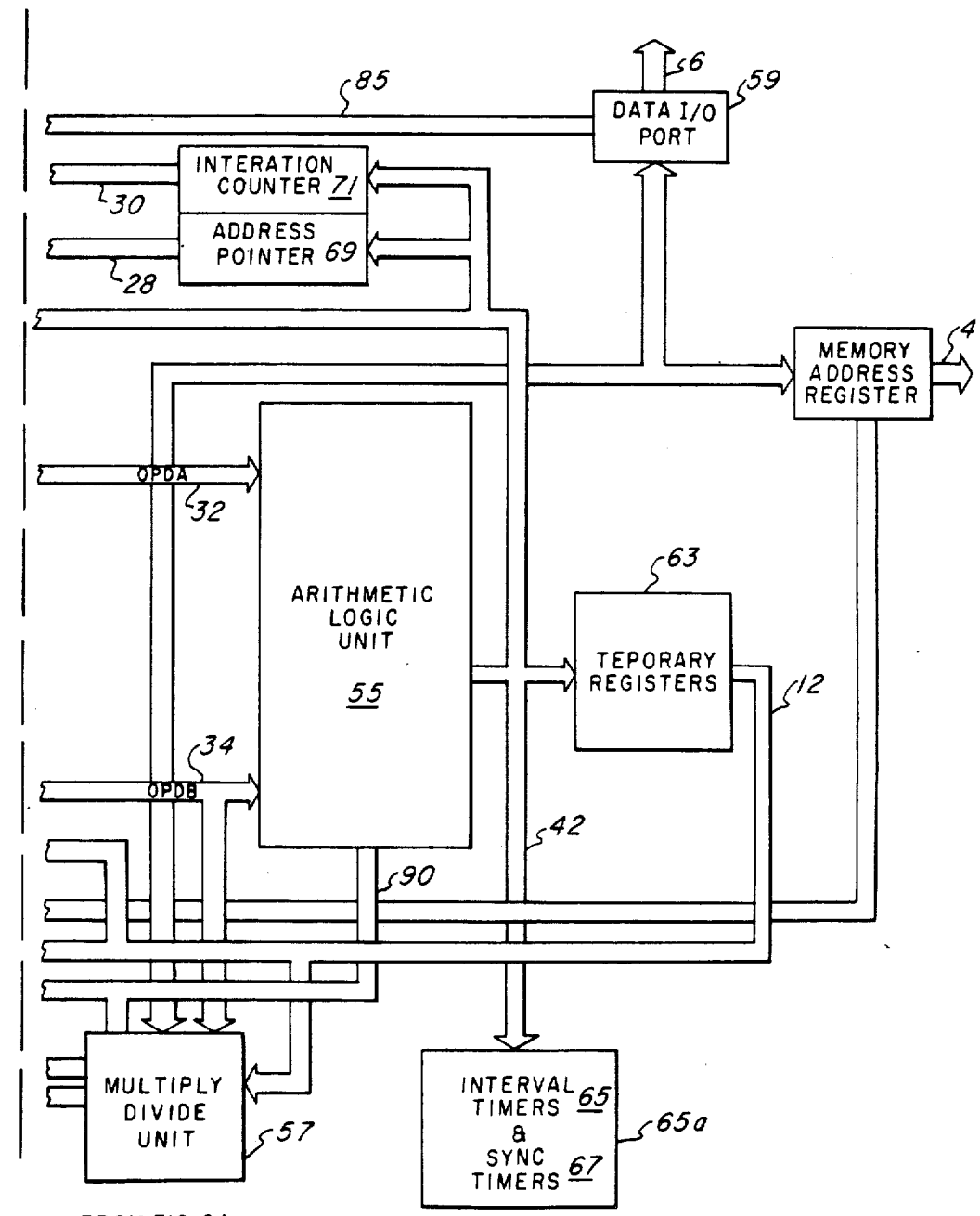

In FIG. 2, to which reference should now be made, there is shown a block diagram of the high-speed processor 10 according to the invention.

Figure 12:
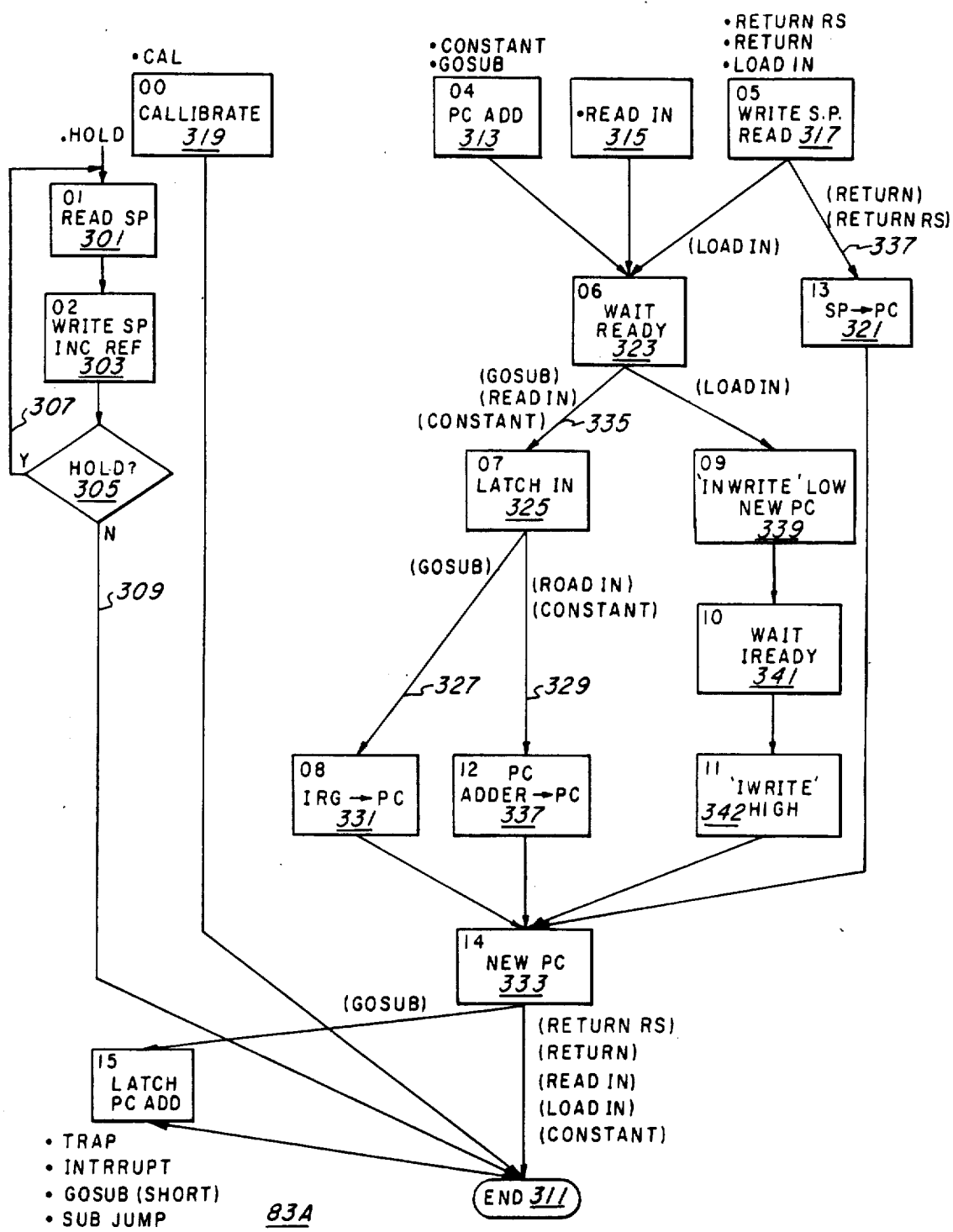
FIG. 12 is a state diagram of the picosequencer logic of FIG. 2.
Figure 13A:
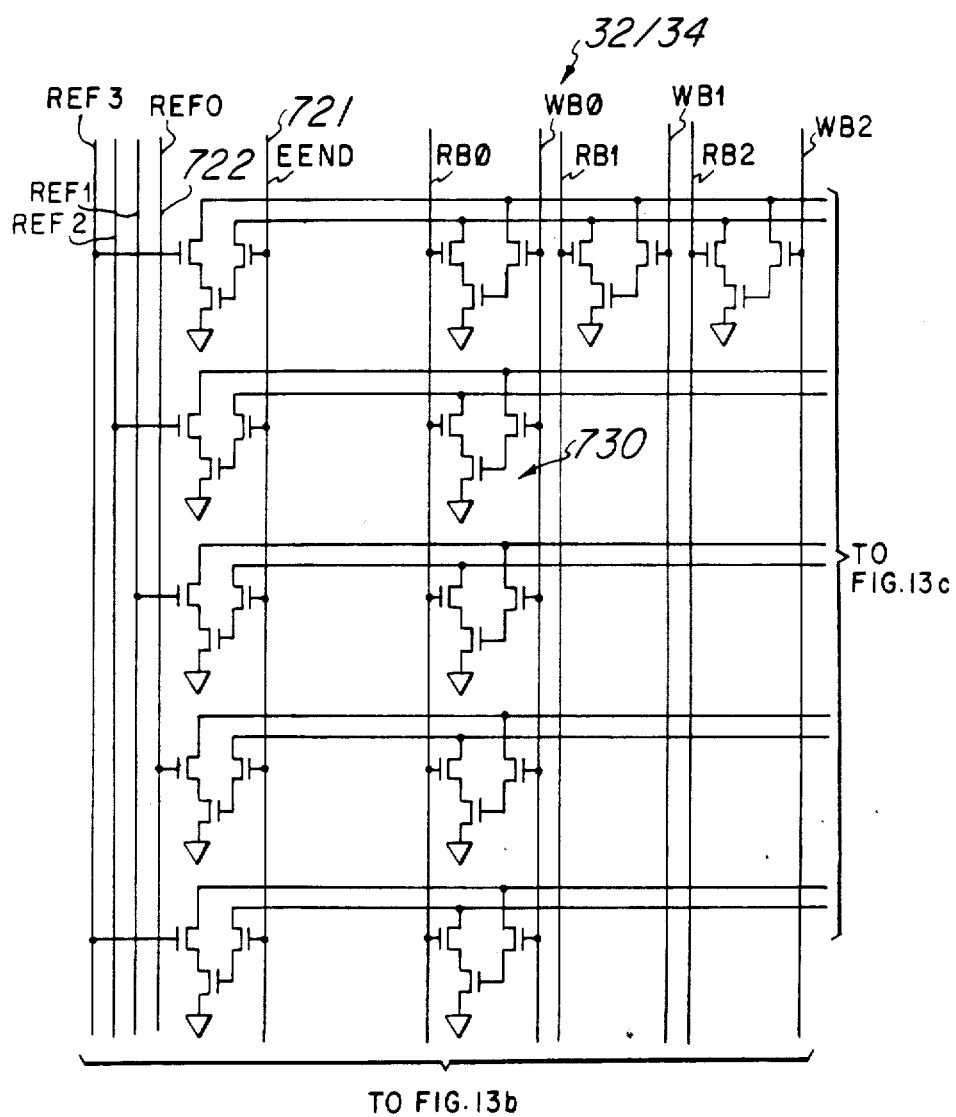
FIGS. 13A through 13F are a schematic diagram of the memories used in the high speed processor according to the invention.
Figure 13B:
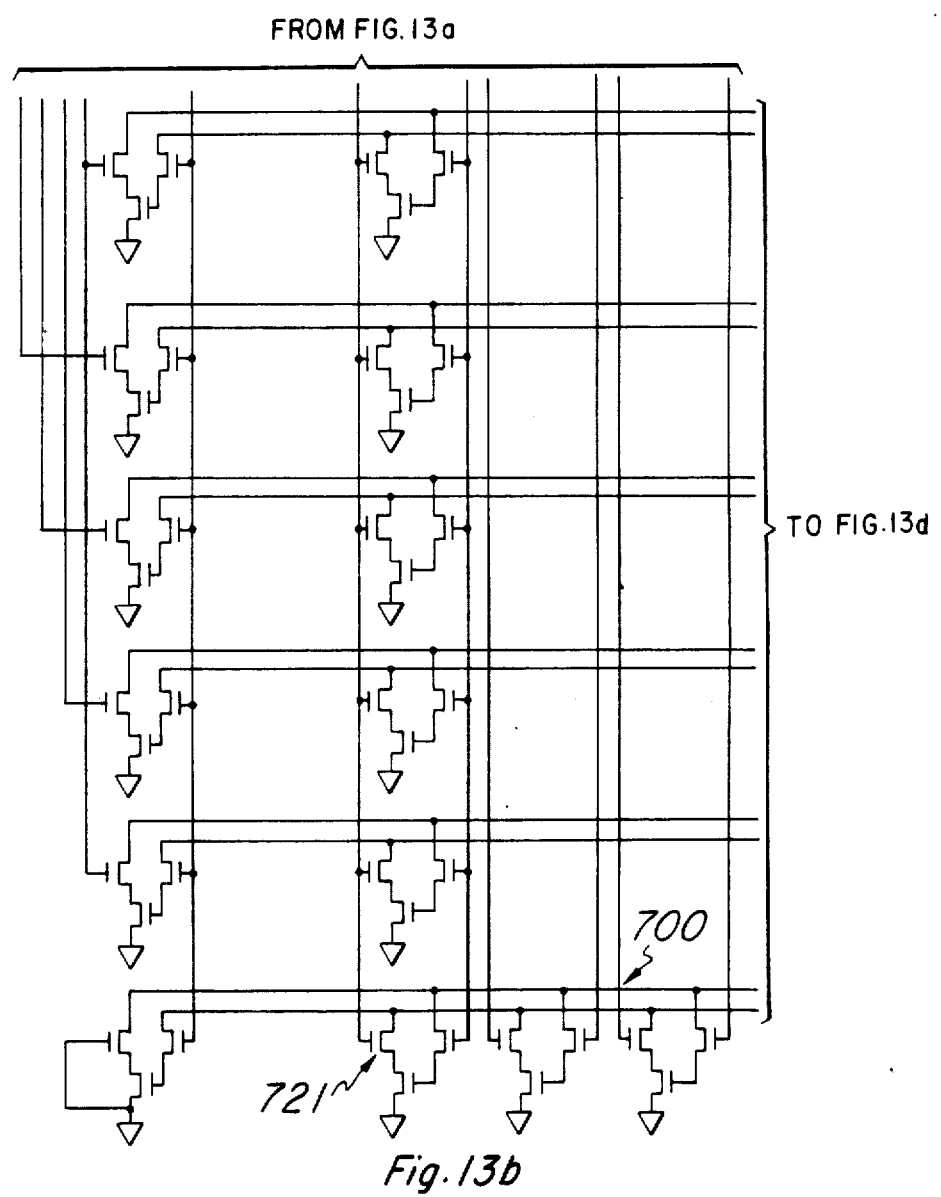
Figure 13C:
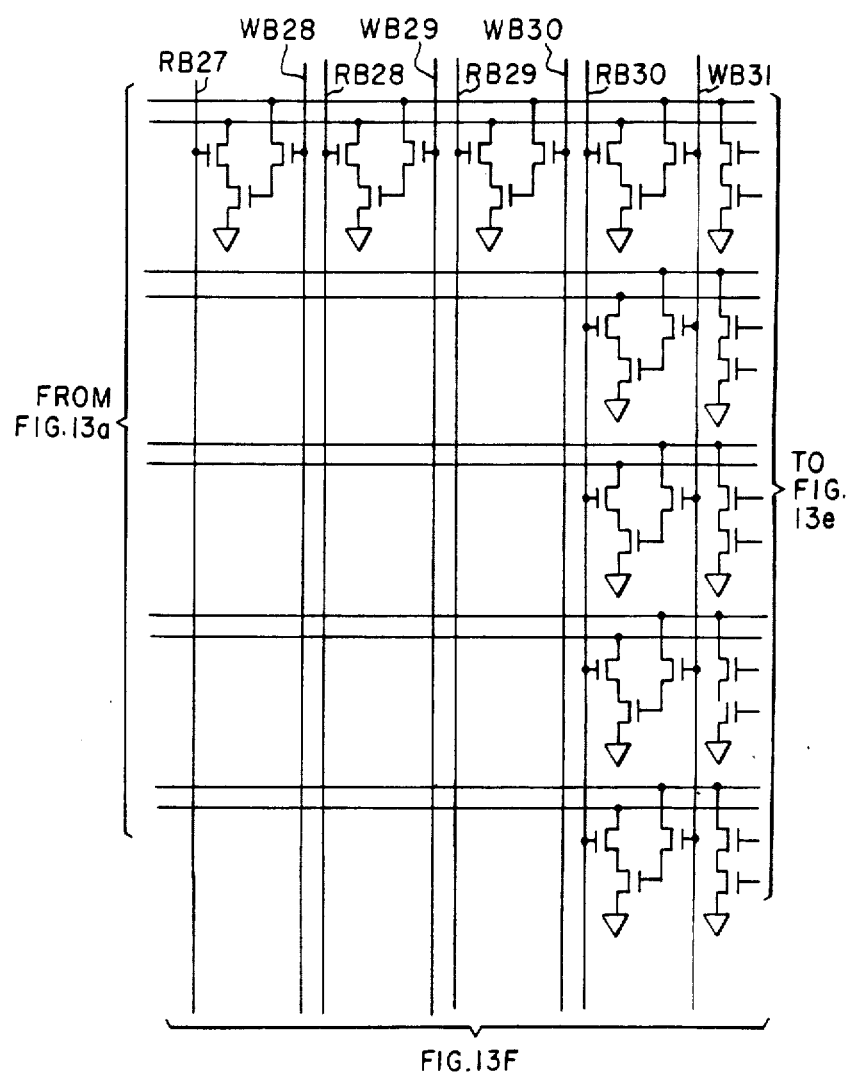
Figure 13D:
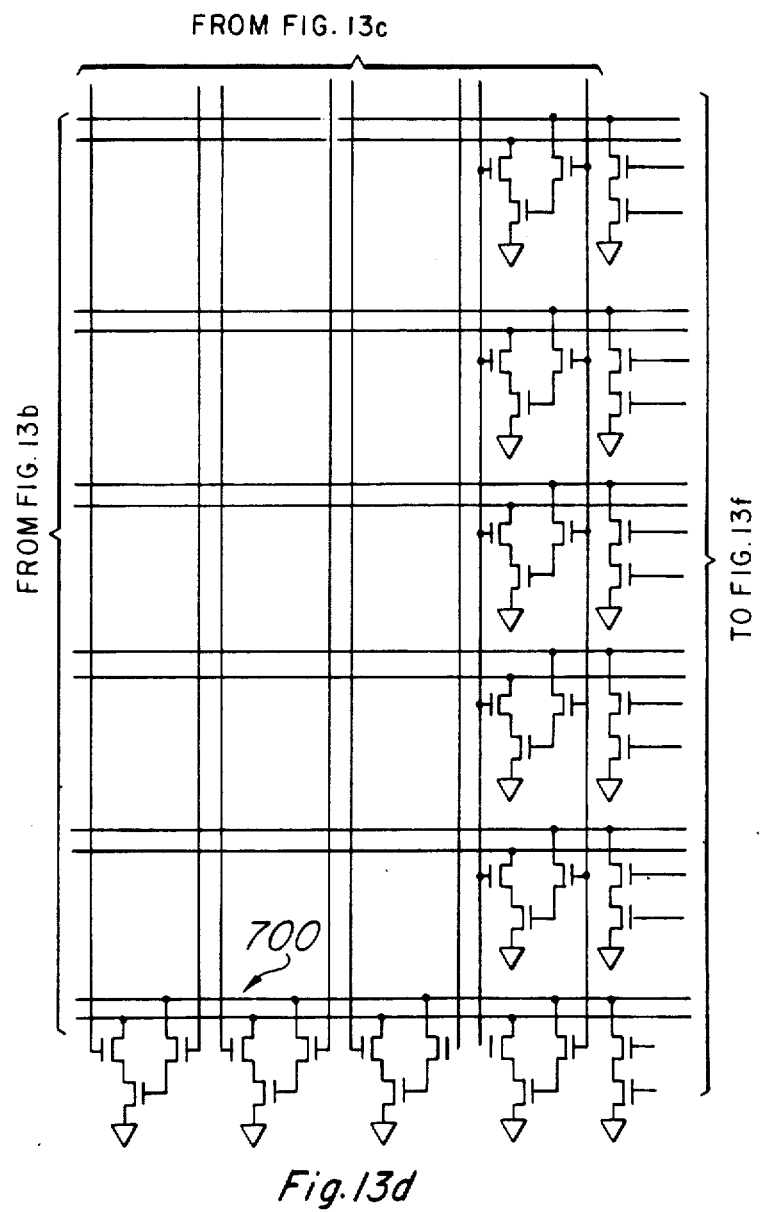
Figure 13E:
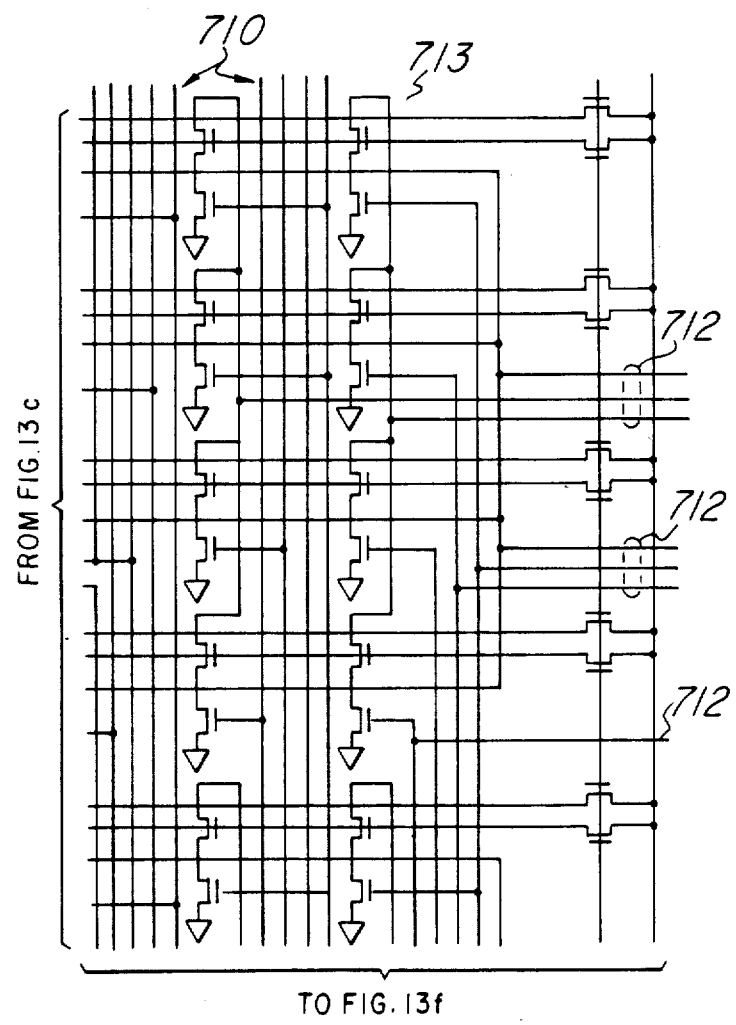
Figure 13F:
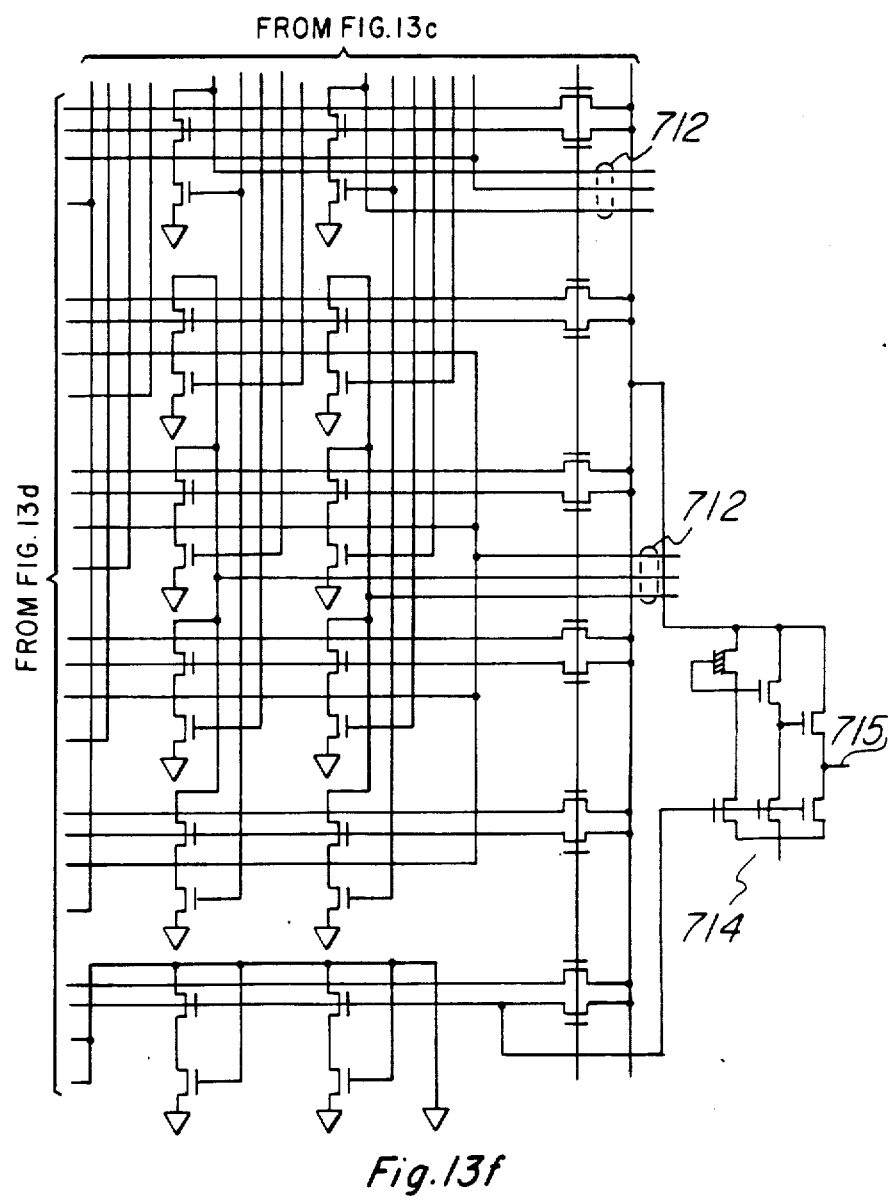

Instruction words are applied via the instruction word input 85 to an address selector 73 via data bundle 26 and to the program counter 81, the operand selector 53 and the instruction decoder 83 via data bundle 14. The instruction decoder 83 decodes the instruction words, which in the embodiment of FIG. 2 are 16 bit instructions, producing control and timing signals for the other functional blocks of the high-speed processor 10. The instructions are executed in one clock cycle, so in essence the decoder generates a large set of control signals which are valid during an instruction cycle. The exceptions to these general cases are handled by a pico sequence logic 83a. The pico sequence logic 83 is used in the execution of instructions that cannot be executed by a simple, straight path through the high-speed processor logic. The pico sequence logic 83a is a state machine with several transition paths through it that depend on the state of the external control signals as well as on the instruction being executed. FIG. 12 is a state diagram of the pico sequence logic 83a. In addition to the pico sequencer logic 83a, there are two other types of instructions that are decoded by the decoder 83 which include a secondary instruction decoder 83b which decodes late control instructions and initial instruction decoder 83c which decodes early decode instructions. Late control instructions are defined as those control signals needed late in the computer cycle (e.g. scratch pad write select) and early control instructions are defined as those signals which must control logic early in the computer cycle (e.g. branch logic, scratch-pad read select). The instructions from the instruction decoder 83 are routed to the different blocks of the high speed processor 10 and are used to provide control to the different blocks as will be explained in conjunction with the discussion of the instruction set contained in tables I and II.

The instructions are also applied to the program counter 81 which addresses the programmed memories that include the memories that are connected to conductor bundle 2 as was discussed in conjunction with FIG. 1 during each sequence of program instructions. The program counter is updated after initial decode of an instruction, such that the next instruction is fetched concurrently with execution of a current instruction. Its sequential operation may be modified by 10, 12, or 16 bit jump operations, 12 and 16 bit subroutine calls and subroutine returns, and exception traps to predefine instruction memory locations. A pointer 69 is, in the embodiment shown of FIG. 2, an 8 bit register and is primary used as a stack pointer maintaining program linkage for subroutines and exception traps. Stack push operations are performed by incrementing the pointer at the beginning of an instruction and using the result as an indirect write address into both the scratch pad A memory 75 or the scratch pad B memory 77 via the address selector 73 and the data bus 22 at the end of an instruction cycle. The scratch pad A & B memories 75 and 77 pop (remove from top of stack, an orderly arrangement of memory in a last in first out (lifo) arrangement) operations are performed by using the pointer as an indirect address for a scratch pad memory read at the beginning of an instruction, followed by a pointer decrement at the completion of the read operation. The address selector 73 is used to select the address source for a scratch pad memory access, either scratch pad A memory 75 or scratch pad B memory 77. Either the scratch pad A memory 75 or the scratch pad B memory 77 or both may be accessed as source operands for a single instructions. An instruction result may be written to either the scratch pad A memory 75 or the scratch pad B memory 77. In the case of a subroutine or a machine exception, both the scratch pad A memory 75 and the scratch pad B memory 77 are written into simultaneously, with the return address being written to only the scratch pad A memory 75 and the current processor status being written to only the scratch pad B memory 77. Address sources include as was discussed above: the pointer 69; interation counter 71; a refresh counter which is implemented through software iteration; and one of three fields within the instruction words which will be discussed in conjunction with the scratch pad A & B memories 175.

The scratch pad A & B memories 175 which (if not evident) includes two memories, scratch pad A memory 75 and the scratch pad B memory 77 that have an architecture which provides capabilities in the embodiments shown in FIG. 2 for two 256 word by 16 bit register arrays. Either the scratch pad A memory 75 or the scratch pad B memory 77 may be addressed in a single instruction and are addressed in one or two ways; indirect and page.

The indirect method of addressing the scratch pad memories 175 is performed by the output of the address pointer 69 which in the case of FIG. 2 is 8 bits or the lower 8 bits of the iteration counter 71 is used as an address into a 256 word block of either the scratch pad A memory 75 or the scratch pad B memory 77.

The page method in the embodiment of FIG. 2 includes 4 bits from a status register 79 which are used to select one 16-word page from within each scratch pad memory block P0-P3.

An iteration counter 71 is used as a 16 bit loop counter and as an 8 bit address pointer into the scratch pad A memory 75. A loop control instruction is provided via data bundle 42 from the arithmetic logic unit 55 which decrements the iteration counter 71, tests for 0, and performs a relative branch using the remaining 10 or 12 bits of the instruction as a relative address if the test result is nonzero. When the iteration counter 71 is used as an indirect address register, the least significant 8 bits of the 16 bit address become an address into the scratch pad A memory 75. In the embodiment shown in FIG. 2, only 6 bits of the 8 bit address pointer 69 are used.

An operand selector 53 provides 1 or 2 operands to be executed by the arithmetic logic unit 55 dependent on the instruction being executed from either the iteration counter 71, the address pointer 69 or the data I/O port 59. Operation of the operand selector 53 is invisible to the user of the high speed processor 10 as the selection is performed by the instruction decoder 83 dependent on the instruction being executed. The operands are presented either to the arithmetic logic unit 55, a multiply divide unit 57 or to a data I/O port 59.

The arithmetic logic unit 55 receives its operand instructions from the operand selector 53 via data bundle 32 and 34 and provides a means for multiple precision arithmetic and shift operations for lengths to 16 words (256 bits). The operations provided are data movement operations-logic operations including AND, OR, and EXCLUSIVE OR-shift operations including combinations of left, right, logical, arithmetic, and circular,—arithmetic operations including add, subtract, increment, and decrement—bit operands that include set bit, reset bit, and test bit and byte operations including versions of most 16 bit instructions, move operations and swap operations.

As background information, the timing of which will be discussed later, status and multiple precision functions are discussed. Status is recorded for logic, arithmetic and bit test instructions. Three bits are provided for arithmetic logic operations. They are, carry, zero, and overflow. These bits are tested singly and in combination to perform conditional branch operations which are 16 bit branch, 12 bit branch and 10 bit branch. See Instruction Set of Table I for definitions. A test bit is provided for a test bit operation. Testing bit 15 (in the embodiment of FIG. 2 the sign bit) provides a test for negative values.

Figure 6A:
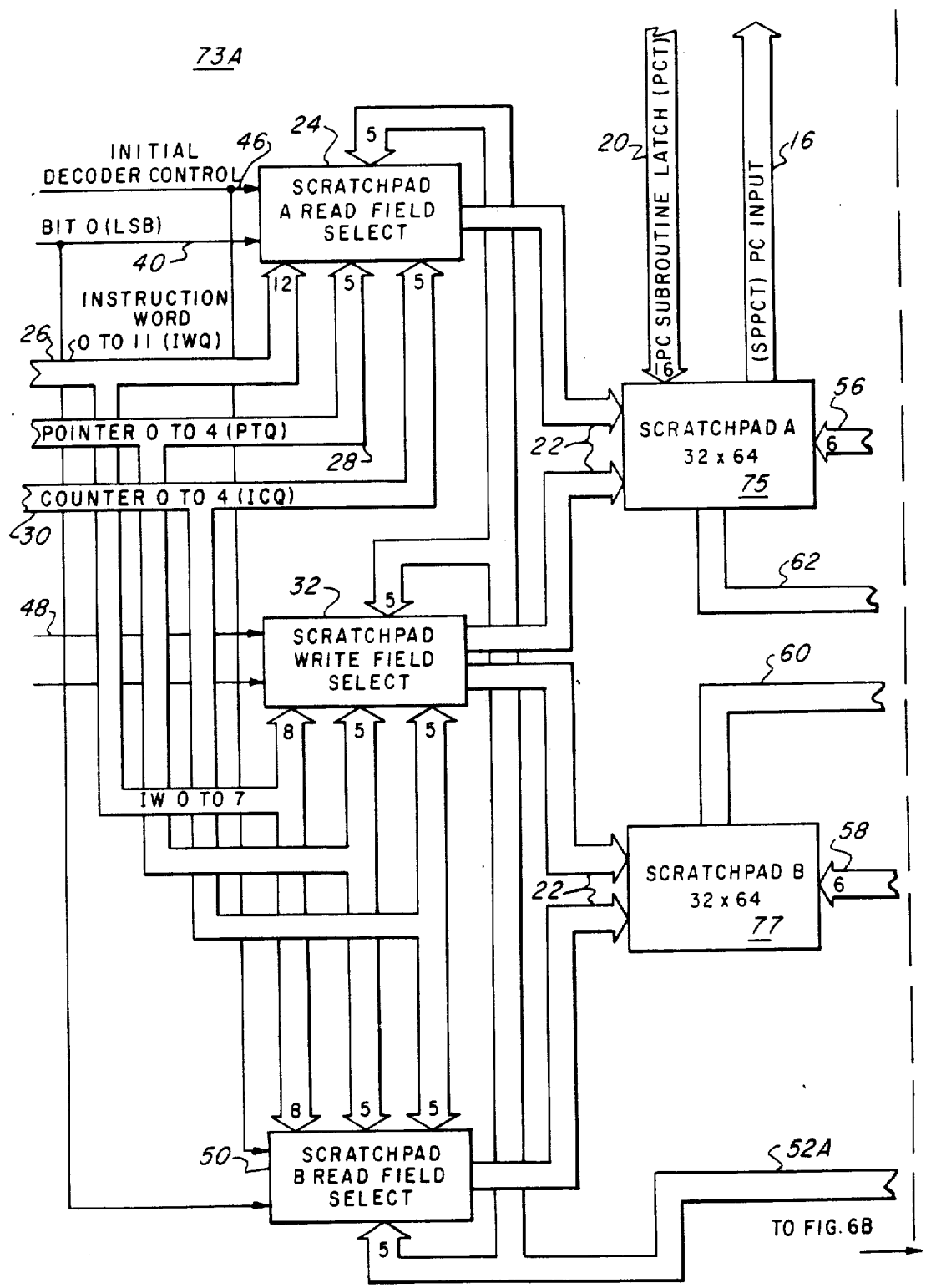
FIGS. 6A and 6B are a block diagram of the address selector of the scratch pad memories of FIG. 2.
Figure 6B:
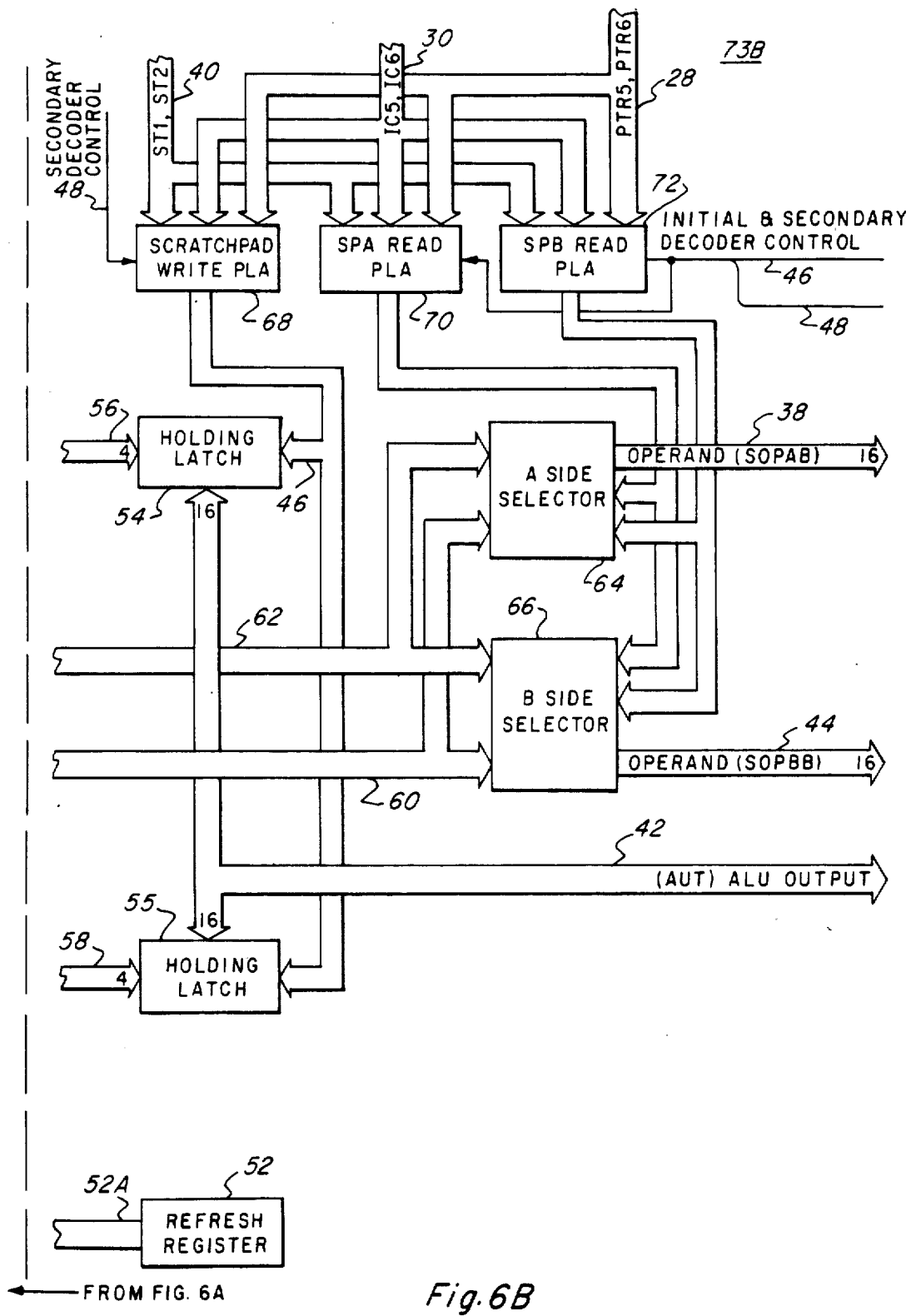

In the case of multiple precisions, the multiple precision operations are performed using a four bit multiple precision counter that is illustrated in FIG. 6. Normally, the carry into the arithmetic logic unit 55 is in a non asserted state, and add, substract, and shift operations are performed on 16 bit words. When the multiple precision counter is set to a non zero value, the carry out for an operation becomes the carry in to the next operation. This will be discussed in greater detail in the discussion of FIG. 8. However, the carry out becomes an intermediate carry for arithmetic instructions and a shift bit saved for shift bit operations. As each operation is performed, the multiprecision counter is decremented. When the count again reaches zero, the carry linkage terminates and the ALU reverts to its normal mode of operation.

A temporary register 63 provides temporary storage of the results from the arithmetic logic unit 55 for further processing or for use as a jump address. This does not imply that the register must be used as an accumulator. The instruction set provides ample means for register to register or memory to register operation. The temporary register 63 is also used heavily in byte operations, as it is the means provided for byte swap and byte load instructions.

A multiply/divide unit 57 performs multiply, divide and multiply/accumulate operations using either signed or unsigned arithmetic. Multiplications are performing using two 16 bit operands. This will be discussed in greater detail in conjunction with FIG. 9. However, both operands are specified in a single multiply or multiply/accumulative instruction. An 8 bit spill over register is used during multiply and accumulate instructions to allow accumulations of results greater than 32 bits. The spill over is loaded, cleared and manipulated in a way consistent with its being an 8 bit extension of a 32 bit accumulator. Division is performed using a 32 bit divided in the multiply/divide unit in a 16 bit divisor specified as a divide instruction. Once initiated, a multiply or divide operation is performed concurrently with following instructions in the main high speed processor 10 instruction stream. For many applications this provides an apparent multiply or multiply accumulate time of one simple type instruction or cycle time.

Timer 65A is the interval timer 65 and sync timer 67 and as indicated in the figure represents two timers. The first interval timer 65 is a 16 bit timer with a resolution of a hundred nanoseconds and a maximum period of 6553.6 microseconds. When a zero is loaded into the timer, the timer is disabled. When a non zero value is loaded into the timer via data bundle 42, the timer begins counting down toward zero. When zero is reached, an interrupt is generated and conveyed to the status of register 79 and the timer reloads itself to its initial value and the process repeats. The second interval timer 67 is a 16 bit timer with a resolution of 500 nanoseconds and a maximum period of 32.768 milliseconds. The timer is normally disabled. When a non-zero value is loaded, the timer begins counting down towards zero. When zero is reached, an interrupt is generated and the timer halts. The intent of the first interval timer 65 is to provide a high resolution timing signal with no accumulative error buildup. The second interval timer 67 provides the capability of timer single intervals of moderately long duration.

A memory address register 61 provides a 16 bit data memory address space. Two separate 16 bit registers are contained within the memory address register 61 and are manipulated by separate instructions. The most significant half (MARM) is contained inside the memory address register chip, and a register may be provided external to the high speed processor 10 for external access. The least significant half of the memory address register 61 (MARL) has its outputs available on the data memory address bus 4.

A data memory bus 6 is used to access to locally independent address spaces. The data space is addressed via the memory address register 61 described above. A separate I/O register space as 64K words may be accessed via the same data lines, the 64K DRAM of FIG. 1, but with an externally latch, independent 16 bit address. Selection of the I/O versus memory data is made with a status register bit that is stored within the status register 79. The data I/O port 59 is designed to facilitate interfacing with other devices such as the Motorola M68000 processors and support chips. Data transactions are performed logically the same as the M68000 scheme. A bus arbitration means is also provided within the data I/O port 59 and will be discussed in conjunction with FIG. 10 which allows the high speed processor 10 to act as a bus controller in a single processor scheme or as a bus master in a multiple master scheme.

The status register 79 performs three major functions. It stores the status of the last arithmetic logic unit 55 operation, defines the operating mode of the high speed processor 10 and defines the scratch pad page as being utilized within the scratch pad memories 175. Bit assignments and further definitions are given in the instruction set contained in Tables I and II. Additionally, the arithmetic logic unit 55 status is recorded at the end of most arithmetic, logic, and shift operations. Three status bits are recorded, zero, carry, and overflow. A fourth bit test is recorded by bit test instructions. Another bit records an overflow of the multiplier divider unit 57. There are additionally load bits set for several operating conditions which effect the high speed processor 10. These include: arithmetic/logic mode; data memory address/data output disable; word/byte mode; interrupt mask; signed/unsigned operation of multiplied/divider; and data memory space mode. A four bit field is defined which provides expansion to 16 pages (1024 bytes) of scratch pad memories 175 and is denoted as the page select field.

An instruction memory interface is utilized via the data I/O port 59 and provides only for input of the high speed processor instructions.

Although the subroutine handling is discussed in greater detail later in the specification, handling of subroutines from an architectural point of view in the features necessary to implement subroutine are discussed in conjunction with FIG. 2. When a subroutine jump instruction is encountered, the address pointer register 69 of the iteration counter 71 is incremented, then the address of the next sequential instruction and the current state of the status register 79 are written into the scratch pad memories 175 in particular the scratch pad A memory 75 at the location indicated by the content of the address pointer register 69. The return address is written into the scratch pad A memory 75 and the status is written into the scratch pad B memory 77. Thus, the processor state is saved and the jump is performed in a single scratch pad memory cycle.

A subroutine return is the inverse of a subroutine call. The return address and saving status are read from the scratch pad memories 175 at the location currently located by the address pointer 69. The address pointer 69 is then decremented. The return address and status are copied to the appropriate registers and the instructions at the return address are fetched for execution.

An additional feature is provided by the architecture of the high speed processor 10 and provides for exception handling. Exceptions are events which occur outside the normally expected flow of instruction execution. For the high speed processor 10, these are interrupts and instruction traps. The handling of the contents of the program counter 81 and the status register 79 is performed in a manner similar to subroutines, except that the branch is to a fixed memory location, dependent on the type of exception. A block of 16 instructions is provided via the instruction word input 85 to allow modification of the status register 79 or other activities to be performed locally beginning at the trap address.

The high speed processor 10 has self-timed logic incorporated therein as will be discussed later, and does not use a clock to control the timing of instruction execution. Instead, each major function block contains the logic required to monitor its own operation. This logic operates on the longest logical and physical path within the functional block so that its timing represents the worst case propagation delay through the block. A "completion" signal of a block becomes the "initiation" signal for the next sequential block. Within a block, operation may be considered to be synchronous, since execution begins on a transition of an input signal. Timing between blocks is essentially asynchronous since there is no overall timing signal connecting all blocks. The number of functional blocks (hence the number of interblock control signals) is quite small, so that the amount of asynchronous operations in connection is also small. This fact, and the fact that most of each instruction is executed serially by block, virtually eliminates the logic race and logic hazard concerns traditionally associated with asynchronous logic.

Instruction throughput is maximized since worst case determinations are made at a block level rather than at the processor level. In a conventional clock system, the shortest clock period can be no longer than that required by a block with the most delay through it. This leads to time latency during instruction phases which required less than the worst case time.

Since the self-timed logic delay logic is built in close proximity to the functional logic components and employs the same field effect transistor logic, the processor is self-adaptive to process variations. This means that a slice yield can be expected to be higher than typical for a bar of its size. The processor is also self-adapted to changes in operation conditions, which means that the parts can be expected to operate across wider environmental extremes.

Figure 3:
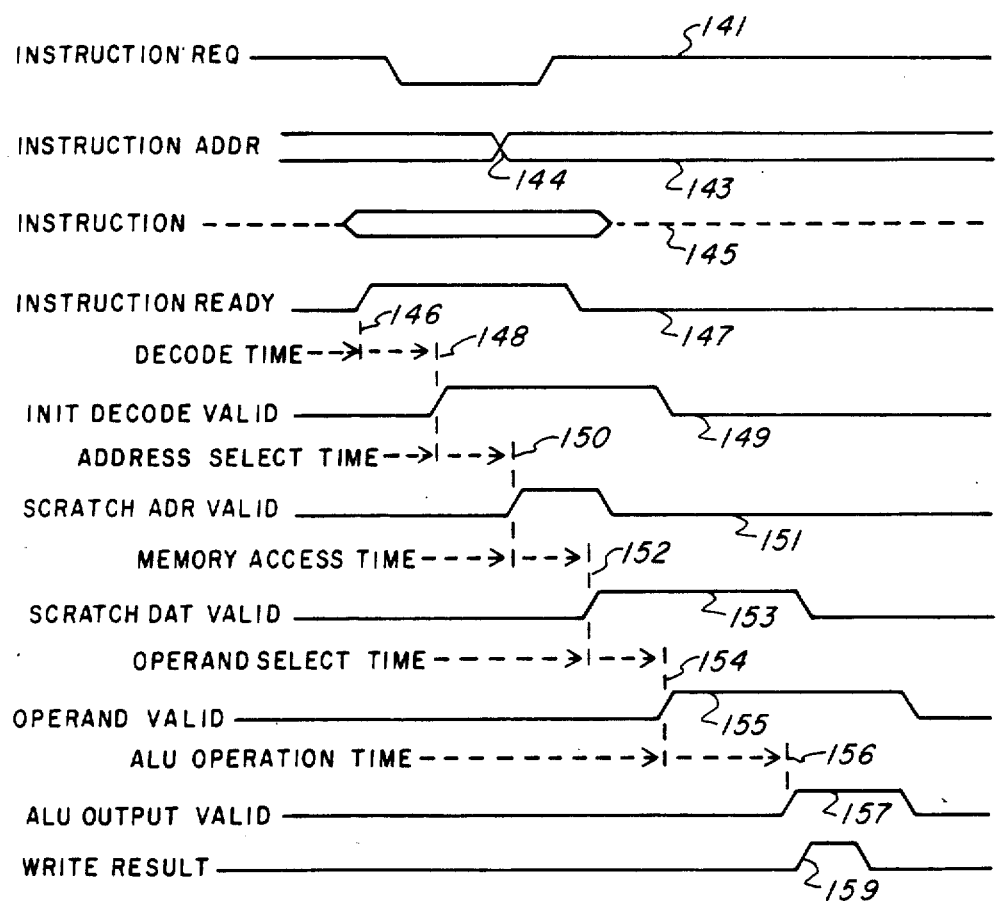
FIG. 3 is a waveform diagram illustrating an instruction execution.

The prefetching of instruction words and the asynchronous execution thereof by the high speed processor is provided in FIG. 3 which should be used in conjunction with FIG. 2. The instruction decoder 83 provides to the instruction word input 85 upon an instruction request that is represented by waveform 141 of FIG. 3. The program counter 81 provides on data bus 2b the instruction address that is represented by waveform 143. The instruction memory, which in the case of FIG. 1 is the resident ROM 1 provides the instruction ready signal, waveform 147, as well as the instructions waveform 145 to the high speed processor 10 via data bundle 2 and in particular to the instruction word input 85. The instruction ready signal causes the initial instruction decoder 83c to generate signals required near the beginning of the instruction execution sequence. The initial decoder 83c is optimized for speed, since the decode process must be completed before the next action or step can be defined. Instruction ready also initiates operation of the secondary instruction decoder 83b, which generates more signals that are not required until later into the instruction execution cycle. When the initial decoder 83c has completed its decoding of the instruction, it generates an initial decode valid signal which is represented by waveform 149 of FIG. 3 and also FIG. 3 illustrates the worst case decode time required to decode the instruction by dimension lines the length or time between 148 and 149. Simultaneously, with the decoding of the instruction by the initial instruction decoder 83, the program counter 81 begins operation. After the initial decode valid signal is received from the initial instruction decoder 83c, the program counter 81 generates the next instruction address and places this information on data bus 2b which is a portion of data bus 2 of FIG. 1. The next address may be an increment of the current address as will be discussed in conjunction with the program counter 81. The new address is placed on the data bus 2b following decoding of the current instruction. This transition occurs at point 144 of waveform 143. This action allows the next instruction request as indicated by waveform 141 to be concurrent with the execution of the current instruction. The initial decode valid signal, which is representative as discussed before by waveform 149, causes the scratch pad address selectors which are a portion of the scratch pad memories 175 to generate an address into the scratch pad memories 175. The source of this address is defined by the initial instruction decoder 83c. When the scratch pad address selector has completed its selection of the scratch pad address, it generates a scratch pad valid signal, which is represented by waveform 151. The time for this execution is illustrated by the distance between dimension lines 148 and 150.

The scratch pad address valid signal as represented by waveform 151 causes the scratch pad memories 175 to access the designated row and column within the scratch pad memories 175. When the scratch pad memories 175 has completed this access into the memory, it generates a scratch pad data valid signal that is represented by waveform 153. Dimension lines 152 represents the time in which the scratch data valid signal is initiated. The scratch data valid signal causes the operand selector 53 to place the scratch pad data onto one side of the arithmatic logic unit 55 and to place another operand onto the second side of the arithmetic logic unit 55. The placements or selections are defined by the secondary instruction decoder 83b. Within the arithmetic logic unit phase there may be several subphases dependent on the instruction being executed. At the completion of the arithmetic logic unit phase, the arithmetic logic unit 55 generates an ALU output valid signal that is represented by waveform 157 at the time that is represented by dimension line 156. The ALU output valid signal causes the arithmetic logic unit output to be written into the destination specified by the secondary instruction decoder 83b. This is indicated by wayform 159. The earliest a result is needed is in the scratch pad read phase of the next instruction. This occurs at the destination register of an instruction is the source register of the following instruction since the write does not need to be complete for the next instruction decode to occur, ALU output valid causes the high speed processor to loop back to the instruction decode phase to await reception of the next instruction ready signal. Thus completing the instruction cycle.

In the event a scratch pad fetch is not required for an operand, (the instruction being executed does not require a scratch pad operand) the associated phases are not executed, thereby shortening the instruction cycle. Another example of an instruction phase shortening is in the arithmetic logic unit 55, where the time required to propagate through the arithmetic logic unit 55 is eliminated when the arithmetic logic unit 55 is not performing an add or subtract operation.

The common characteristic of all instructions is that they are executed in one pass through the processor logic (only one scratch pad memory read access is performed; only one ALU operation is performed). This limits the complexity of the actions which can be performed by one instruction, but simplifies the logic of the processor and enhances the speed at which they are executed. The only exception to the "one pass" characteristics are the two word instructions that load 16 bit constants and performs 16 bit programs functions. These executions only loop through part of the logic associated with instruction acquisition. The largest part of the data path is still passed through only once.

In FIG. 3 the dimension lines 146, 148, 150, 152, 154, and 156 illustrates how an event occurs at the completion of a preceding event.

Figure 4A:
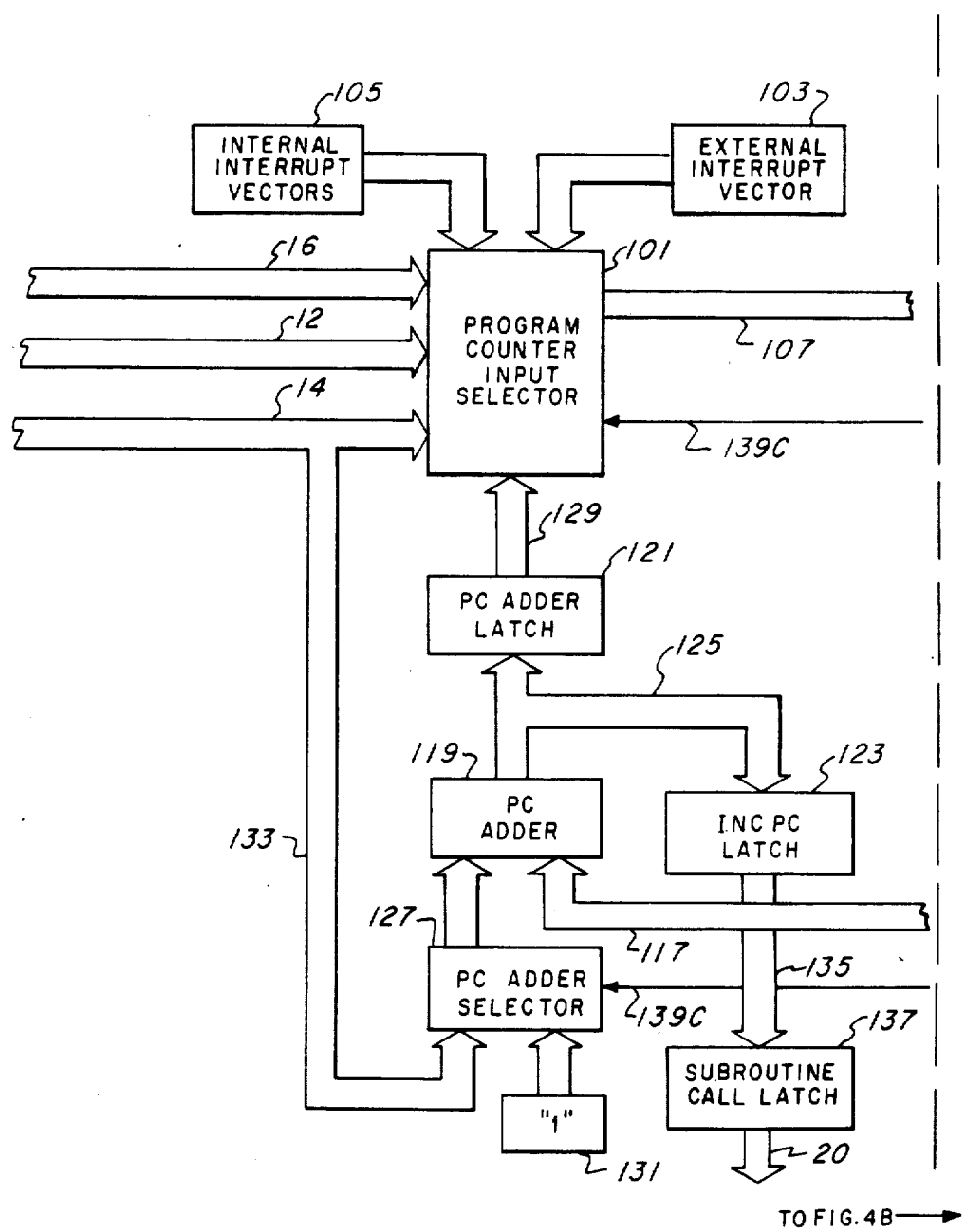
FIGS. 4A and 4B are a block diagram of the program counter of FIG. 2.
Figure 4B:
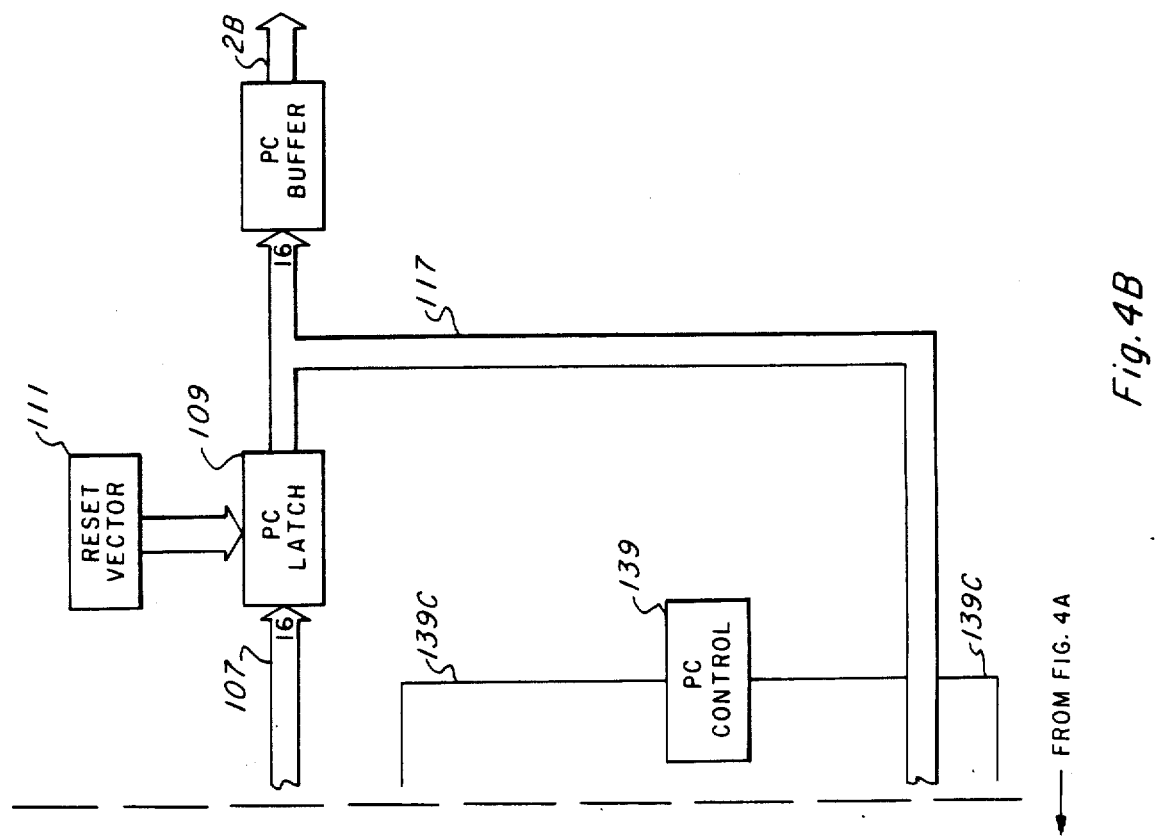

FIG. 4 is a block diagram of the program counter 81 of FIG. 2. A program counter input selector 101 receives inputs from the scratch pad A memory 75 by a data bus 16, outputs from the temporary register 63 by a data bus 12, and instruction word inputs from the instruction word input 85 by a data bus 14. The scratch pad A memory 75 output provides to the program counter input selector 101 "RETURN" and "RETURNS" instructions. The output of the temporary register 63 includes subroutine jump instructions "SUBJUMP", "JUMP" instruction, Ax(Bx) IW, IW Ax(Bx). (Refer to Tables I and II for explanation of this operation) The program counter input selector 101 handles the external interrupts from the external interrupt vectors or the interrupt caused by the interval timer 1, interval timer 2, or a trap interrupt by the internal interrupt vector 105. The output of the program input selector 101 is controlled by a program counter "PC" control 139. Program counter control 139 is applied to a "PC" latch 109 which is reset by a reset vector 111. The output of the PC latch 109 is applied to a PC buffer 115 and to the data bundle 2b. Additionally, the output of the PC latch is applied to the PC vector adder 119 where it is summed with the instruction word that is present on beta bundle 113 and includes branch instructions and short "GOSUB" subroutines. A PC adder-selector 121 selects either the instruction words or a bias logic 1 that is provided by the logic 1 circuit 131 which represents normal instructions, two-word instructions, Ax(Bx), IW, IW, Ax(Bx), GoSub, Subjump, internal interrupt, external interrupt, short "GoSub" Reference should be made to Tables I and II for the explanation of these routines. The selection of one of these routines, of course, is controlled by the PC control 139. The PC adder 119 combines the output of the PC adder-selector 121 with the output of the PC latch 109 and applies that to a PC adder latch 127 as well as an interrupt PC latch 123, which is connected to the PC adder 119 by data bundle 125. PC adder latch 127 holds the contents for application to the program counter input selections and PC program counter input select 101 selects the function on data bundle 129 for normal instructions, branches, two-word instructions, Ax(Bx), IW, and IW Ax(Bx). The output of the interrupt PC latch 123 is applied to a subroutine call latch 137 by a data bundle 135, the output of which is activated to execute "GOSUB", "SUBJUMP", internal interrupts, external interrupts.

Figure 5A:
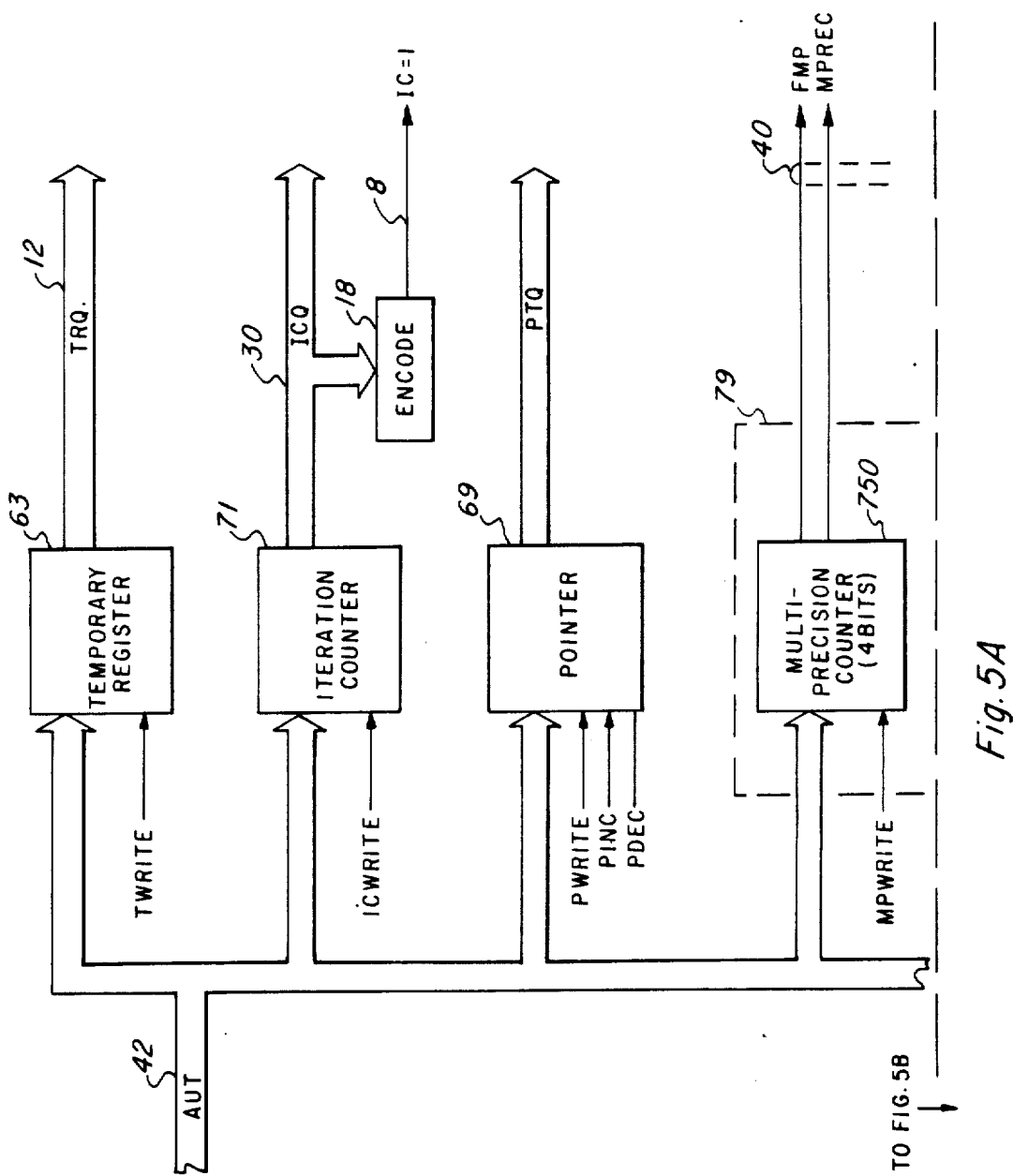
FIGS. 5A and 5B are a block diagram of registers illustrated in FIG. 2.
Figure 5B:
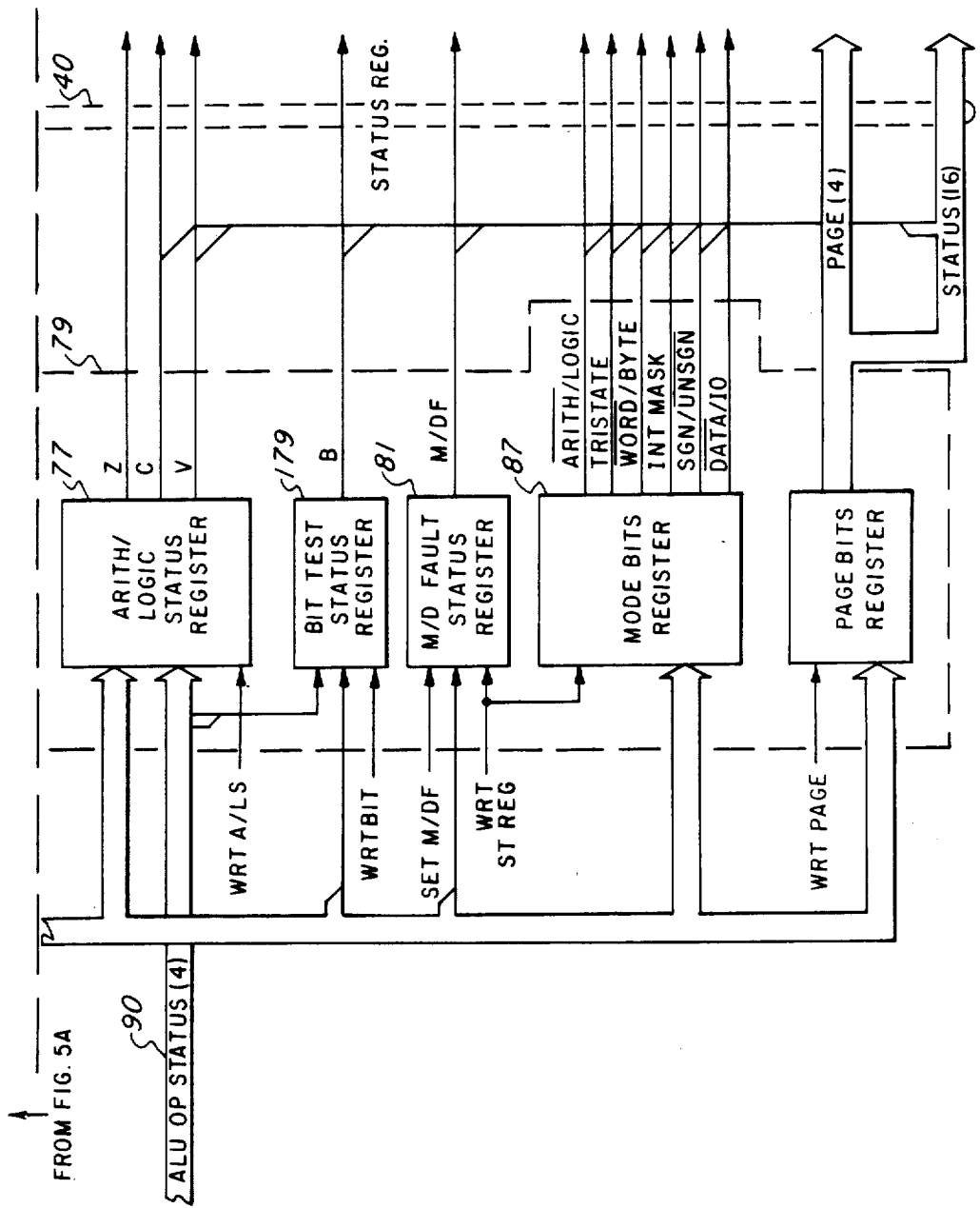

FIG. 5, to which reference should now be made, contains a block diagram of the registers that are illustrated in FIG. 2. In particular, the output or the arithmetic logic unit 55 is applied to the data bus 42 in which the signals are represented by the MNEMONIC, AUT, and are applied to the temporary register 63, the interation counter 71, the address pointer 69, as well as to the status register 79. The data is loaded in the temporary register 63 by the command to write, which originates from the instruction decoder 83, and in particular the secondary instruction decoder 83b. The iteration counter 71 also receives the output of the Arithmetic Logic Unit 55 and begins upon the currents of signal ICwrite, counting the operations necessary to perform the decoded instruction. The output of the iteration counter 71 is applied on data bundle 30 and also to an encode circuit 18 which provided as an output on conductor 8 as a status signal indicating that the contents of the iteration counter 71 is equal to one, when this is the case. Additionally, as was discussed in conjunction with FIG. 2, the output of the arithmetic logic unit 55 is applied to the address pointer 69 which under the control of the PWRITE command, PINC command and PDEC command. The address pointer 69 output is applied to data bus 28 for application to the address selector 73 and the operand selector 53. The control commands, of course, come from the secondary instruction decoder 83b.

The status register 79 consists of six independent registers which stores the status of the arithmetic logic unit 55, and the functions being implemented by the high speed processors during the execution of instructions provided to it by the instruction word input 85. These registers include a multi-precision counter 75, an arith/logic status register 77, a bit test status register 179, an M/D fault status register 81, a mode bit register 87 and a page bit register 89.

The multi-precision counter 75 is used to count the iteration for performing the multiple precision operation and is controlled by the mnemonic MPWRITE and provides on its output the mnemonics EMP which is a status indicating the command to execute multiple precision and MPREC which is the mnemonic that indicates multiple precision operation is complete. In the embodiment shown in FIG. 5, the multiple precision counter 750 is a four-bit counter. Normally, the carry into the arithmetic logic unit 55 is a nonasserted state, and add, subtract and shift operations are performed on 16 bits words. When the multiple precision counter 750 is set to a nonzero value, the carryout from an operation becomes a carry in to the next operation. The carry-out thereby becomes an intermediate carry for arithmetic instructions and a shift bit saved for shift operation. As each operation is performed, the multiple precision counter 750 is decremented. When the count, as indicated by the mneumonic MPREC reaches zero, the carry linkage terminates and the arithmetic logic unit reverts to its normal mode of operation. This process will be discussed in greater detail in conjunction with FIG. 8, the block diagram of the arithmetic logic unit.

The arithmetic/logic status register 77 has three outputs. These are Z, C, and V and is controlled by the mnemonic WRT A/LS. The arithmetic/logic status register 77 stores the status of the arithmetic logic unit 55 under the control of the secondary instruction decoder 83b. These statuses include, as indicated above, the Z status or zero.

The Z bit is set if the result on an arithmetic, logic, or shift operation is zero. For a compare instruction, the Z bit indicates that the operands are equal.

The C bit is set if a carry-out of the most significant bit occurred during an arithmetic operation. For a shift operation, it is a copy of the bit that was shifted out of the operand in which case the Z bit is undefined on a logic operation.

The V bit is set if the result of an arithmetic operation could not be represented in a 16 bit two's complement location which, of course, indicates an overflow condition. For an arithmetic left shift operation, it indicates a change in sign of the most significant bit.

When a test is called for by the instructions that are applied to the instruction decoder 83, then a bit status register 179 stores the results of the test as indicated by the decoded instruction WRTBIT. The T-bit is modified by the test bit instruction, this state is a copy of the bit that is tested on the output of the arithmetic logic unit 55 and is contained on the data bus 42.

The M/D fault status register 81 indicates a fault in the multiply/divide operation of the multiply/divide unit 57 and stores a fault if the multiply/divide unit 57 provides the command set M/DF at the occurrence of the command WRT ST REG which is decoded by the secondary instruction decoder 83b. The M/DF bit is set by the multiply/divide unit 57 at the end of its operation if division by zero is attempted or if a multiplied and accumulated result cannot be represented by a 32 bit number.

The mode bit register 87 loads the status of the output of the arithmetic logic unit 55 on the command of the WRT ST REG from the secondary instruction decoder 83. These include the logic mode operation which is represented by the mnemonic, ARITH/LOGIC which indicates that certain op codes perform two distinct operations dependent upon the state of the logic mode bit as represented by the above-referenced mnemonic which is set and reset by the processor program. The two operations use the same operand and store the results in the same locations. The differences in the operation, which switches between an arithmetic and a logic function. In general the switch is according to the "T@NEXT" command which is defined further in Tables I and II, that contains the detailed descriptions of the instructions. The setting of the logic mode bit to 1 will indicate the logic operation of (A and B), (A or B), (exclusive A Or B) and logic shift A. When the logic mode bit is set to zero, then mode bits indicate the arithmetic function of A plus B, A minus B, B minus A, and arithmetic shift A. The mnemonic, TRISTATE, is the output disable bit. When this bit is set by the high speed processor program, the data memory addresses that are connected to data bus 4 of FIG. 1 and the data bus drivers are disabled.

The WORD/BYTE indicates the byte or word mode operation. When the byte mode is set by the high speed processor program, the logic address in the memory address register 61 are used as byte addresses, and transactions with the data memory are performed with bytes. When this bit is reset, the logical operations in the memory address register 61 are used as 16 bit word addresses and transactions with the data entry are performed with 16 bit words. Memory references are always to 16 bit words, regardless of word or byte mode. When in the byte mode, only one byte is read or written from the address 16 bit word.

Interrupt mask is represented in FIG. 5 by the mnemonic, INT MASK, and is set by the high speed processor program when the interrupt input is disabled on data bus 6 of FIG. 1. The interrupt input is level triggered rather than edge triggered as is the case with most computer logic. If the interrupt line is asserted when the interrupt mask bit is set off, then interrupt sequence will be initiated.

Sign multiply function is indicated by the mode bit register 87 with the SGN/UNSGN mnemonic and when set by the high speed processor program, multiply and divide functions are performed as two's complement operations. When the bit is not set, these operations are performed unsigned. Data IO is the IO mnemonic and is set by the high speed processor program when references to external data memory buses are directed to the high speed processor IO addresses which are a 64K block independent of the data memory. When this bit is not set, bus accesses are directed to data memory.

The page bit register 89 is controlled by the mnemonic WRT PAG which is decoded, of course, by the secondary instruction decoder 83b and provides a page select field that is used to select a 16 word page from the scratch pad memory 175. Direct scratch pad generation is performed by a four bit field from an instruction to the pad select field provided by the page bit register which is contained within the data bus portion 91 of the data bus 40. Both the scratch pad A memory 75 and the scratch pad B memory 77 addresses are generated from the same page select field. The four bit field that is contained within the data bus portion 93 of the data bus 40 provides a maximum capacity of 16 pages. This information will be discussed in conjunction with the addressing of the scratch pad memories 175.

FIG. 6, to which reference should now be made, is a block diagram of the address selector 73 and it connection to the scratch pad memory 175. The address selector is illustrated as two portions, 73a and 73b. Portions of 73a includes the scratch pad A read field selector 24, the scratch pad write field selector 32 and the scratch pad B read field selector 50. Whether or not there is a write or read operation is determined by the secondary decoder control that is provided on data bus 48 to the scratch pad write field selector as well as the initial decoder control tht is present on conductor 46 and provided to both the scratch pad A read field selector 24 and the scratch pad B read field selector 50. The least significant bit or bit zero from the status register 79 is provided to the scratch pad A read field selector 24, the scratch pad write field selector 32 and the scratch pad B read field selector 50 for indicating the necessary status for implementing a page read or write function. Each selector, read or write, A or B selects a portion of either the instruction word as present on data bus 26, the address pointer that is present on data bus 28 or the output of the iteration counter or a portion thereof that is present on data bus 30 for application to the scratch pad memories 175. Conductor or data bus 22 connects the scratch pad memories 175 to the address selector 73. The address in the scratch pad memories 175 is generally made up of two separate portions. Additionally, there are three scratch pads decoders which are implemented with programmable logic arrays and are denoted as the scratch pad write PLA 68, the SPA read PLA 70, and the SPB READ PLA 72. The scratch pad write PLA 68 is controlled by the secondary controls that are provided on data bus 48 from the secondary instruction decoder 83b and the SPA read PLA 70 and the SPB read PLA 72 are controlled by both the initial instructions that are decoded by the initial instruction decoder 83a and provided on data bus 46 as well as the late controls that are provided by the secondary instruction decoder 83b and applied to data bus 48. Each PLA decodes a combination of 3 signals, these include two of the status page bits ST 1 and ST 2 as well as two of the iteration counter bits that are present on data bus 30 and two of the pointer bits that are provided by the address pointer 69 of FIG. 2 which are used to either implement a write operation within the scratch pad memory or a read operation from the scratch pad memory by the control of an A side selector 64 and a B side selector 66.

The output of the scratch pad memories are denoted as SOPAB and is present on data bus 38 for application to the operand and selector 53 and SPOBB which is present on data bus 44 also for application to the operand selector 53. The output from the scratch pad write PLA 68 is applied to both an A holding latch 54 and a B holding latch 55. The A holding latch 54 is connected to the scratch pad A memory 75 by data bus 56 and provides the output of the arithmetic logic unit that is present on data bus 42 under the control of the output from the scratch pad write PLA 68 for loading into the scratch pad A memory 75 at the address that is present on data bus 22. In a similar fashion, the B holding latch 55 will provide to the scratch pad B memory 77 the data that is present on the output of the arithmetic logic unit that which is connected to data bus 42 via the data bus 58 under the control of the decoded instruction from the scratch pad write PLA 68. The read operation will cause the address that is present on data bus 22 that is generated in a manner that will be discussed later to apply the output of the scratch pad A memory on data bus 62 to the A side selector 64 as well as to the B side selector 66 and also apply the output of the scratch pad B memory on a B data bus 62 to both the A side selector 64 and the B side selector 66. The addresses for the scratch pad memories 175 are generated in both direct and indirect addressing modes. A direct address is generated by connecting the page select field of the status register 79 which was discussed earlier with a four bit field from an instruction word that is applied to the address selector via data bus 26.

The instruction field is always on a hexadecimal binary bit boundary. 1, 2 and 3 register instructions are provided. The status register in the direct mode provides four bits, the least significant bits are page information as was discussed in conjunction with the status register 79, and the instruction word provides four bits of address information which provides an 8-bit addressing of the scratch pad memories 175. However, in the embodiment shown in FIG. 6, only seven bits are used, being there are only six full pages provided in either the scratch pad A memory 75 and the scratch pad B memory 77. Additional addressing which explains the reason for the scratch pad A read field selector 24, scratch pad B read field selector 50 and the scratch pad write selector 32 is provided from the iteration counter and is an indirect means of addressing the scratch pad memories 175. The least significant 8 bits of the iteration counter 71 are used as addresses into the scratch pad memories. Selection of the A or B side of the scratch pad memories is determined by the instruction being executed as provided from the instruction decoders 83. As in the case of the direct addressing discussed above, only the least significant seven bits are implemented in the embodiment of FIG. 7. Additional indirect addressing is provided by the address pointer 69. In this mode, the contents of the pointer register is used as the address into the scratch pad memories 175. Selection of the A or B side of the scratch pad memories 175 is determined by the instruction being executed as is decoded by the secondary instruction decoder 83b. The pointer addressing, however, is limited since subroutines and interrupt linkage will be upset if the pointer address register is not maintained. The least significant bits from the pointer register 69 is used in the embodiment of FIG. 6. The scratch pad A read field selector 24, scratch pad write field selector 32, and scratch pad read field selector 50 are updated by a refresh register 52.

Figure 7B:
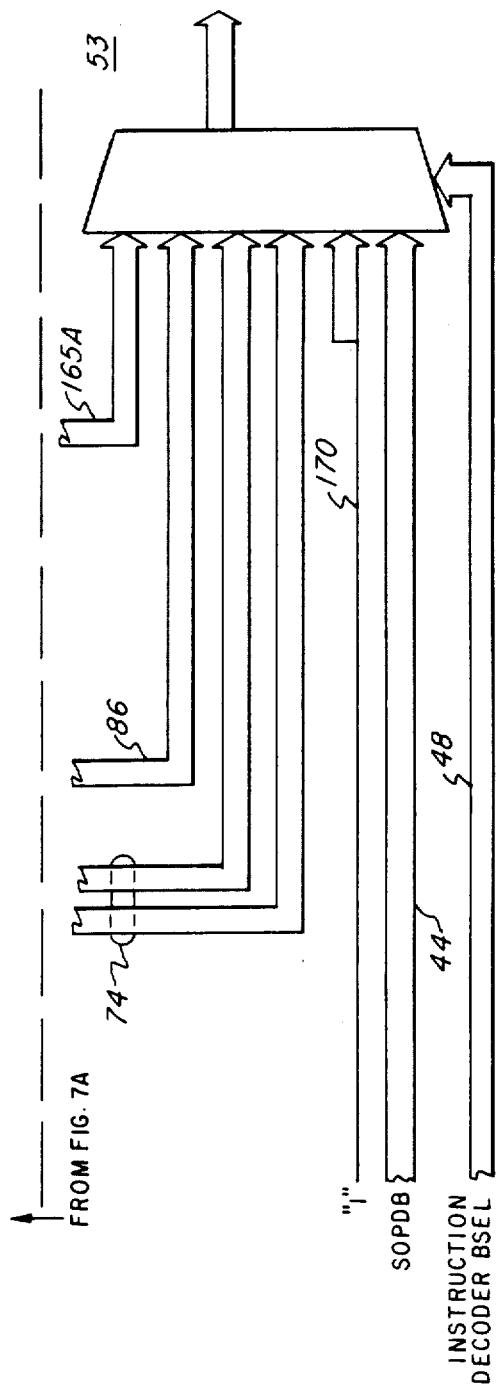

FIG. 7 is a block diagram of the operand selector 53. The operand selector 53 includes an A selector/multiplexer 161 and a B selector/multiplexer 163. The A selector/multiplexer 161 selects one of the signals that are applied to it for application to the arithmetic logic unit 55, multiply/divide unit 57 or memory address register 61 via its output which is designated by the mnemonic, OPDA, and is present on data bus 32. The A selector/multiplexer 161 selects either the output of the scratch pad memory which is represented by the mnemonic, SOPDA, and is present on data bus 38; the output of the address pointer 69 which is present on data bus 28; the output of the instruction word counter 85, which is represented by the mnemonic, ILQ, and is present on data bus 14; the output of the status register 79 which is represented by the mnemonic, STQ, which is present on data bus 40, where STQ refers to the complete status register that is contained within the status register 79 and is a portion of the data bus 40; the output of the iteration counter 71 which is represented by the mnemonic, ICQ, and is present on the data bus 30; the output of the data I/O port 59 which is represented by a mnemonic, TOTDBQ, and is present on data bus 86; the output of the memory register 61 that is present on data bus 60 and is represented by the mnemonics, MARMQ and MARLQ; and the output of the multiply/divide unit 57 which is present on data bus 74 and is represented by the mnemonic, MDMQ and MDLQ; a logic zero bias that is present on data bus 168; the output of the temporary register 63 via data bus 12; and a byte reversal of the output of the temporary register 63 that is present on the data bus 12 with the mnemonic, TRQ, at point 165. The A selector/multiplexer 161 is controlled by the A selector signals that are present on data bus 48 from the secondary instruction decoder which is represented by the mnemonic, ASEL. The B selector/multiplexer 163 selects either the TRQ signal that is present on data bus 12, the TOTDBQ signal, the MDLQ signal, a logic one bias signal that is present on data bus 170, and the output of the scratch pad memory that is present on data bus 44. The B selector/multiplexer is controlled by the B selector signals which are represented by the mnemonic BSEL which is present on data bus 48 and is decoded by the secondary instruction decoder 83C.

Figure 8A:
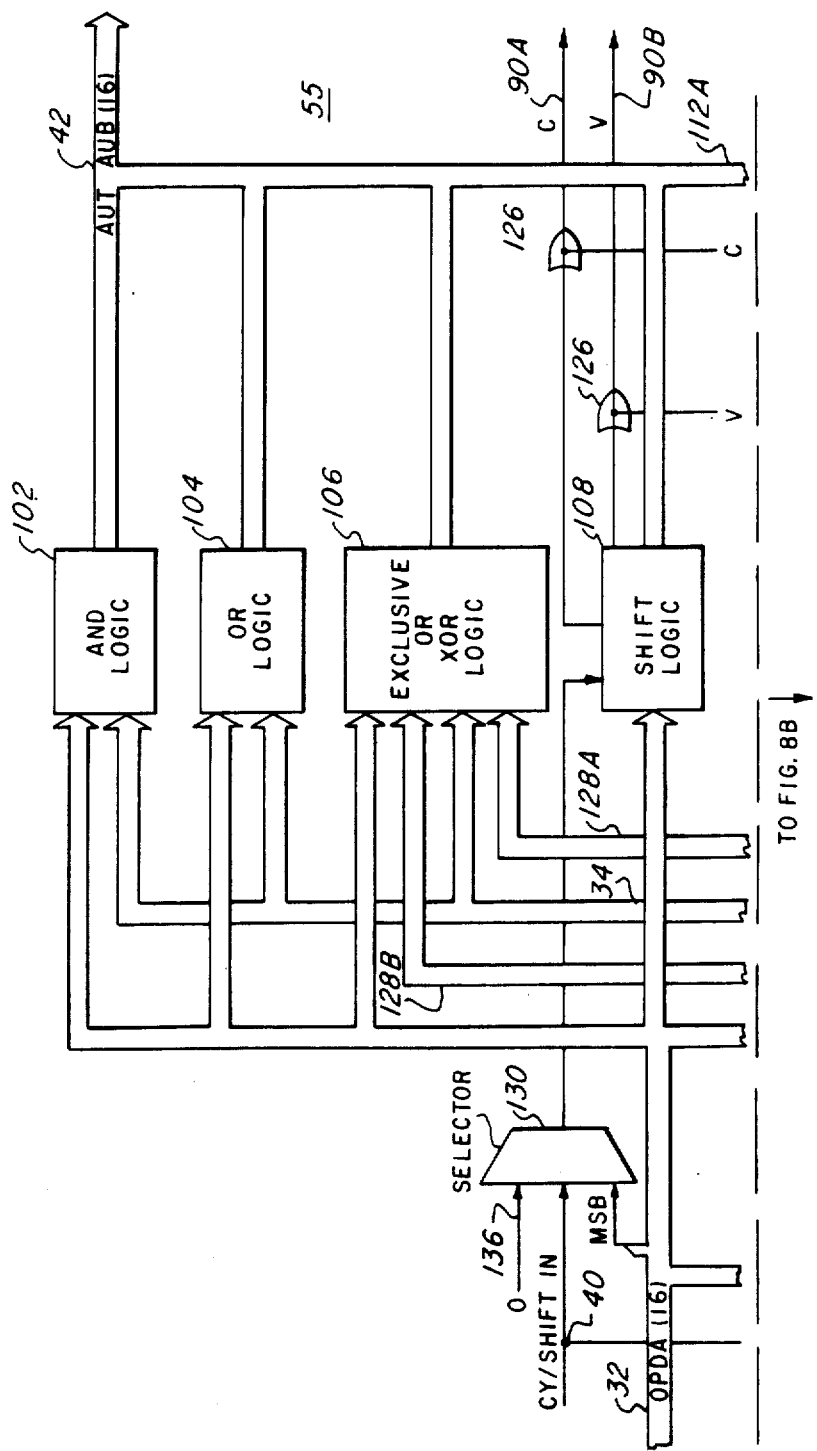

FIG. 8, to which reference should now be made, is a block diagram of the arithmetic logic unit 55. The carry 40 from the status register 179 is brought in to a selector 130, which selects either the most significant bits on the output of the operand selector A side OPDA that is present on data bus 32, or the carry-out from the arith/logic status register 77 of FIG. 5 which is denoted as C, or a logic zero bias 136. The output of the selector is used as an input to the shift logic circuit 108 which provides, during shift operations, an output on data bus 42, as well as an indication of a carry of data bus 90A or an overflow condition on data bus 90B. AND LOGIC 102 combines the output of the A side of the operand selector 53 with the output on the B side of the operand selector 53 that is present on data bus 42 to provide the combination of the two sides; OR LOGIC 104 logically OR's the two sides of the operand selector 53; exclusive OR logic 106 exclusively or's the two sides of the operand selector 53. It should be noted that to perform the exclusive "OR" function, that the two sides needs to be logically inverted which is done by the invert logic 128. Pass through logic passes through the A side output of the operand selector 53 which is applied thereto by data bus 32 to the output data bus 42. Bit set and bit reset logic 12 is used to set (1) or reset (0) one bit of the A side operand. The bit to be set or reset is contained in the instruction and decoded by the binary decoder 132 which also decodes which bit is to be tested by the bit test logic 116 which tests the data that is present on data bus 32 and applies the result to the bit status register 79. A pre-add logic 114 performs AND, NOR, and exclusive OR operations on the data that is present on both sides of the operand selector 53 and applies these functions to an adder 118 which indicates the overflow conditions and carry condition, the output to which is applied to a buffer 120. And gate 122 combines the signals that are present on data bus 42 to indicate a zero condition on status line 90C. The test, of course, is provided on status line 90D.

Figure 9A:
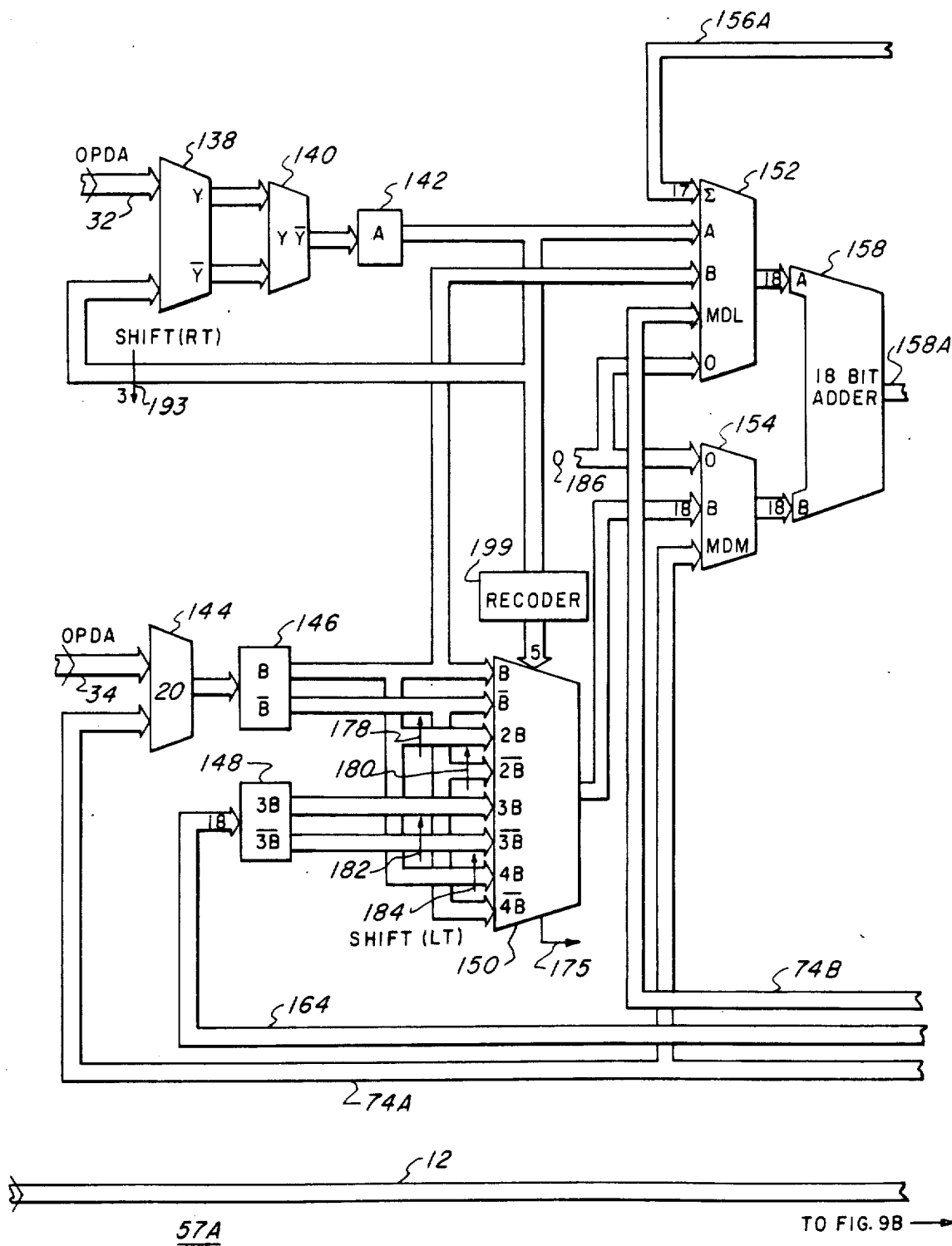
FIGS. 9A and 9B are a block diagram of the multiply divide logic of FIG. 2.
Figure 9B:
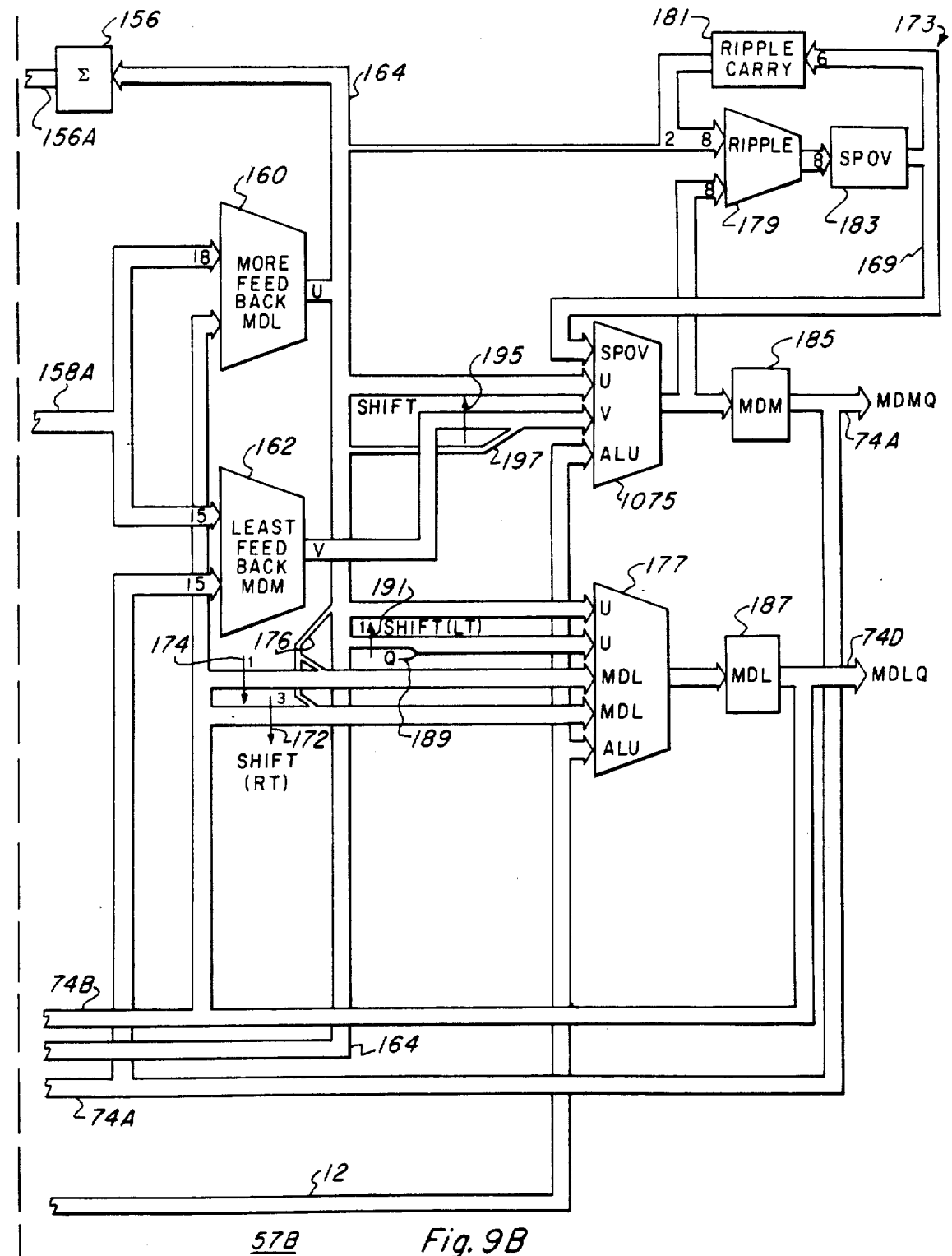

In FIG. 9, there is illustrated a block diagram of the multiply/divide unit 57 in which the A output of the operand selector and the B output of the operand selector are applied to the multiply/divide unit 57 by data bus 32 and 34 respectively. The A output of the operand selector 53 is applied to a first selector 138 which provides both a Y output and a $\overline{Y}$ output, the output of which is applied to a Y.Y selector 140. The Y to the first selector 138 is the output of an A register 143 which provides for the shifting of the three most significant bits out of the data word at point 193. The output of the Y.Y selector 140 is applied to an A register 142 for application to the third selector 152. As will be discussed later, the multiply/divide circuit of FIG. 9 implements a Boothe's algorithm for performing the multiplication and addition. This algorithm, as traditionally implemented, requires the shifting of the data bits that are contained within the data word that comprises the multiplicand, either towards the least significant side, referred to herein as the right side, or the most significant side, referred to herein as the left side. As part of the implementation of the Boothe's algorithm, a recorder 199 recodes the data word that is on the output of the A register 142 into a select code and applies it to a preselector 150. Depending on the output of the recorder 199, a B selector 150 selects either the B output, which is defined as B side from the operand selector 153 as applied to a second selector 144, and provides to a B complement register 146 either the B or the B. The B is defined as the most significant output of the multiply/-divider and is present on data bus 74A and is fed back to the input of the second selector 144. The selector 150 may also select the 2B output which is defined as 1 bit shift left at point 178 of the B output or the 2B output which is defined as a 1 shift to the left of the B output; or a 3B output and its complement as provided by register 148. The 3B output and its complement is the output signal that is present on data bus 164 which will be defined later but is applied to the 3B, 3B register 148 for application to the B selector 150. The B selector 150 can either select additionally the 4B which is defined as the B output of register 146 after being shifted two bits to the left at bit shaft point 182, or the 4B output which at point 184 is a 2 bit left shift and is applied to the B̄ output of the register 146. The output of the B selector 150 is applied to a fourth selector 154 which selects either its output on data bus 74A which is the most significant side of the multiply/divide output, or a zero bias signal that is present at 186, or the output of the B selector 150 for application to an 18 bit adder 158. The 18 bit adder 158 sums the output of the fourth selector 154 with the output of a third selector 152. The third selector 152, of course, represents the A side of the operand selector, and the fourth selector represents the B side of the operand selector. The third selector provides either the A output of the A register 142, the B output of the B, B̄ register 146; the output of the low side of the multiply/-divider that is present on data bus 74B; a zero bias as provided at zero bias 186, or the output from the summation register 156 which is the output of the more feedback selector 160, which either selects the output of the 18 bit adder 158 or the output of the least significant side of the multiply/divider that is present on data point 74B for application back to the third selector 152 via a summation register 156.

The output of the 18 bit adder 158 is applied to a more feedback selector 160 and a least feedback selector 162. The more feedback selector 160 selects either the output from the least significant side of the multiply/divide circuit that is present on data bus 74B or the output of the 18 bit adder 178 for application to the summing register 156, the more selector 175 or the 3B/3B register 148. The output of the least feedback selector 162 selects either the output from the most significant side of the multiply/divide circuit or the output of the 18 bit adder for application to the more selector 175, after being shifted to the left one bit at point 195 and combined with a bit by the combining circuit 197 which combines a single bit from the more feedback selector 160 output as is present on conductor 164 with the output of the least feedback selector 162 after being shifted one bit to the left at point 197. The more selector 175 selects one of four outputs for application to the MDM register 185 which holds on data bus 74A the most significant bits of the output of the multiply/divide unit 57. The selections include the output from a spillover circuit 188; the output from the more feedback selector 160; the output from the least feedback circuit 162 after being modified by a shift 195 and a combination 197 or the output from the temporary register 63 that is present on data bus 12 and applied to the more selector 175. The least selector 177 selects one of five inputs for application to the MDL register 187 which holds the least significant data bits on data bus 74B. The output of the least selector 177 includes the output from the more feedback selector 160; the output from the more feedback selector 160 after being modified at point 191 by a one bit shift left, and combined with a logic zero at 189; a first least significant output that was shifted to the right at point 174 and combined with a bit from the more feedback selector 160 at point 176; and a second least significant feedback that has been shifted three bits to the right at point 172 and combined with three bits from the more feedback selector 160 via data bus 176 and also the output from the temporary register 63 which is supplied to the least significant selector 177. An overflow condition is indicated by a fault that is applied to the fault detector 173. The overflow condition is detected by a spillover circuit 188 which includes a selector 179 which selects two bits from the output of the more feedback circuits 160 and 175 that are combined with the output of a ripple carry circuit 181 or the output from the more selector 175. The output of the ripple selector 179 is applied to a SPOV register 183 which will indicate via data bus 169 to a fault detector 173 the case of a spillover. A key factor circuit is completed by applying the outputs from SPOV register 183 to the ripple carry 181 and also to an input in the more selector 175.

FIG. 10 is a block diagram of the memory address register 61 and the data I/O port 59. The initial instruction decoder 83c checks the data format to determine the mode of operation, either word or byte mode bit. When the byte mode bit is set by the process of program, the logical address is in a most significant memory register MARM 78 and in a least significant register 76 which is denoted as MARL as byte addresses and transactions with the data memory are performed with data bytes, rather than with data words. When the word/byte bit is reset, the logical address in the MARM register 78 and the MARL register 76 are used as 16 bit word addresses and transactions with the data memory are performed with 16 bit words. It should be noted that memory references are always in 16 bit words regardless of word or byte mode. But in the byte mode, only one byte is read or written from the address 16 bit word. The address is provided to the memory by a conductor 4 after being selected by an address mode selector which selects one of four inputs for application to a three state buffer 82 which connects the selective address to an external memory of FIG. 1 via data bus 4. It should be noted that data bus 4 is a 16 bit conductor.

When in the byte mode, since the values in MARM and MARL represent a byte address, the output address must be effectively shifted 1 bit to the right so as to represent a word address. This is done by the B inputs to the address mode selector 80. MARM is output using only the most significant 15 bits of Buss 32. The least significant bit of MARM becomes the most significant bit of MARL, with MARL being shifted one bit to the right. The least significant bit of MARL is used in conjunction of the byte selector 94 and 88 to control the I/O at the proper byte.

The address mode selector, of course, is controlled by the word/byte signal, a conductor that is part of data bundle 46.

The data I/O port interfaces data to the high speed processor 10 by a data bus 6. For incoming data, a Schmitt trigger input 92 filters the data and applies it to a byte selector 94 as well as to an AND gate 95 that is controlled by the word byte signal 46. The byte selector selects either a first or second byte whereas the AND gate 95 passes a byte through to create the total data bits that are present on data bundle 86 and is applied to the operand selector 53 of FIG. 1. The output is applied by the output of the operand selector 53 via data bundle 32 to a byte selector 88 that is controlled by the word/byte signal that is decoded by the initial decoder 83c and to a three state buffer 86 for application to the data bus 6 and the attached peripherals that are illustrated within FIG. 1.

Figure 11:
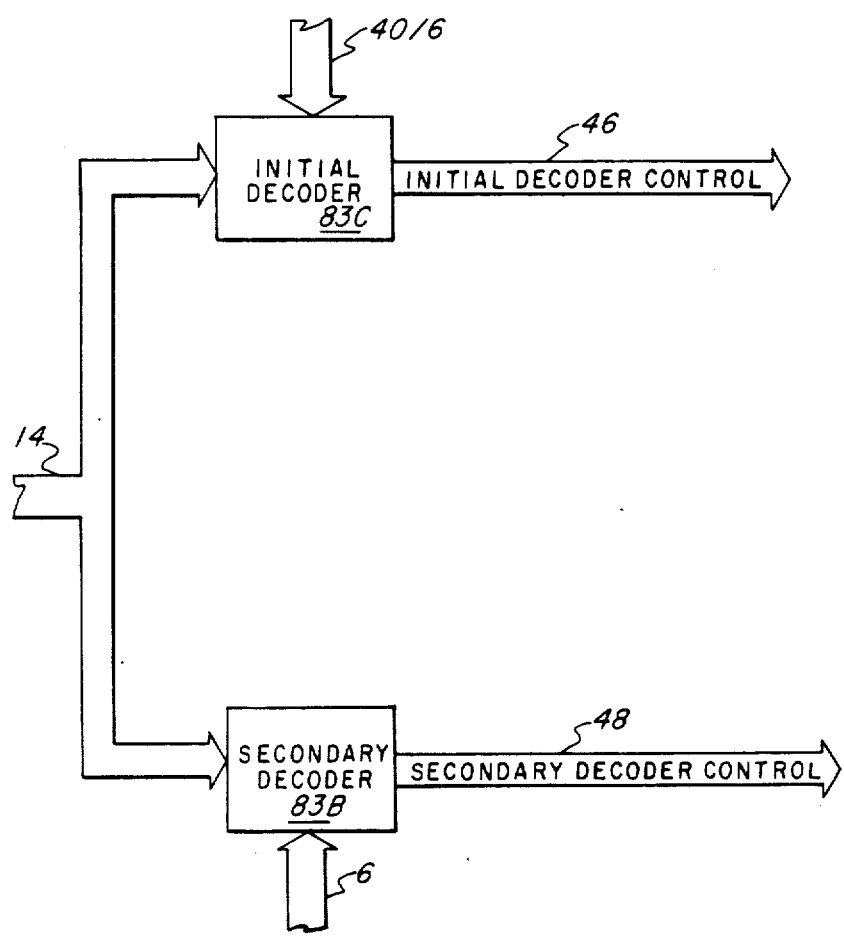
FIG. 11 is a block diagram of the two sections of the instruction decode logic of FIG. 2.

FIG. 11 is a block diagram of the initial decoder array 83c and a secondary decoder 83b. The decoders are decoding arrays which decode the instruction words for the appropriate signals and applies them to the output data busses 46 and 48 respectively. The status bits and control bits are applied via data bus 40 and 6 to the initial decoder 83c and control bits are applied to the secondary decoder 83b.

The picosequencer logic 83a is a state machine that upon given commands performs as stated operations, therefore FIG. 12 is a state diagram of the state machine that comprises the picosequencer logic 83a.

The picosequencer logic generates sequences necessary to implement three sequences of logic plus a calibrate logic. These include the hold sequence, the CONSTANT and GOSUB sequence, and the RETURNS, RETURN and LOAD-IN sequence. The end block follows the calibrate sequence which is executed at state 0 indicated in FIG. 12 at 319 provides the capabilities of implementing the calibration of self time oscillators. This embodiment, although not shown implemented in the embodiment of FIGS. 1 and 2, enables the high speed oscillator 10 to be used with complex communication systems which require accurate timekeeping capabilities and thus periodic calibration of the self time oscillators used to generate the time keeping function is required and is calibrated during the sequence represented by block 319; following block 319 the sequence ends at end point 311.

The next path that is used is the hold sequence that is utilized in bus arbitration and is represented in the pin assignments contained within Table III as a request and is asserted when the high speed processor 10 is waiting for access to the data memory address phase. During this period of time the picosequencer logic 83a will read the scratchpad memory at block 301 and will refresh the scratchpad memory at block 303 by writing into the scratchpad memory and increment the refresh counter; the sequencer next goes to decision block 305 where it loops until the "grant release" signal is asserted so that the high speed processor 10 may have access to the data bus for the data memory addressed space. Following the receipt of the "grant release" signal, the picosequencer proceeds via line 309 to the end block 311.

The picosequencer additionally is called upon to provide the logic states for handling of two word instructions. These include the CONSTANT, the GOSUB, and the RETURN RS, RETURN, and the load instruction word instructions. The GOSUB or called subroutine instruction and the constant instruction which means load a scratchpad memory with a constant, essentially is implemented at block 313 by addressing the program counter and progressing to the wait block 323 until the instruction ready signal referred to in FIG. 3 is received. Additionally, for the return from a subroutine instruction and also the RETURN RS which means to restore status in addition, and the load instruction word instructions are initiated at block 317 where the picosequencer logic causes the high speed processor 10 to wait until the I-READY signal is received at block 323 and the program counter at block 321 is loaded with the contents from a scratchpad memory. Simultaneously with the execution of the sequence that begins with block 313 or 317, a request for an instruction word is generated at block 315. The picosequencer 83A proceeds to wait for the instruction ready signal at block 323, as illustrated by waveform 147 of FIG. 3. For the path that begins with the arrow 337, the picosequencer 83A causes the high speed processor 10 to proceed to state number 9 at block 339 which requires the loading of the program counter at 339. At state number 10 the microprocessor 10 waits for the I-READY signal that is represented by Waveform 147 of FIG. 3. This occurs at block 341. The results are loaded at block 342, state 11, and the high speed processor 10 proceeds to state 14 at block 333 and outputs a new value for the program counter, then proceeds to the end block 311. Line 335 is taken for the GOSUB instructions, the read instructions and the constant instructions. For the read instruction words and the constant command line 329 is taken where at block 332, state 12, the program count adder, PC adder 119 of FIG. 4 is loaded into the program counter. In which case the picosequencer proceeds to state 14 at block 333. For GOSUB routines at state 8 the vectors are implemented at block 331, a new value for the program counter is output at block 333, and then at block 343, state 15, the program counter address is latched in and the high speed processor proceeds to state end.

To FIG. 13, to which reference should now be made, there is shown a schematic diagram of either the scratchpad A memory 75 or the scratchpad B memory 77. Both memories are random access memories with a plurality of memory stages 730. The precharge occurs by the END signal that is present on bus 721 and the logics are evaluated by the reference 0, 1, 2 & 3 which are provided on data bus 722. The scratchpad memories are designed to take a minimal amount of time to perform either a write or a read operation. Consequently, a domino circuit 700 is provided which provides the worst case time delay loading of the scratchpad memory and includes a maximum number of RAM cells 721 which are located the furthest distance away from the output terminals. An enable pulse is provided on the output of inverter 714 at data line 715 when the operation is complete, and thus enables the high speed processor 10 to operate in an asynchronous fashion. Select lines are provided by control line 712 to the select logic 713 and data lines 710 provide the write control signals for loading data into memory.

It should be noted that the circuit illustrated in FIG. 13 is also implemented in the initial instruction decoder 83c, the secondary instruction decoder 83b additionally, which are ROM type memories with the domino circuit 700 and the amplifier 714 provided to insure the maximum speed of evaluation for the pulses.

Although specific embodiments of the preferred form of the present invention have been described herein, variations may be made in the construction, arrangement or operation of the parts or elements of the various embodiments as disclosed herein without departing from the spirit and scope of the invention as defined in the following claims.

TABLE I
REGISTER MNEMONICS

| | |
|---|---|
| DB or MEM — | 16-bit external data bus |
| IC — | Iteration counter |
| IW — | Instruction word |
| IT1 — | Interval timers |
| IT2 | |
| MARM — | More significant 16 bits of data memory address |
| MARL — | Less significant 16 bits of data memory address |
| MD — | Multiply/divide register |
| MDM — | More significant 16 bits of MD |
| MDL — | Less significant 16 bits of MD |
| PAGE — | Scratchpad page register |
| PREC — | Mutiprecision register |
| PTR — | Pointer |
| TR — | Temp register |
| TRM — | More significant byte of TR |
| TRL — | Less significant byte of TR |

TABLE II
INSTRUCTION SUMMARY BY FUNCTION

This Table summarizes the instruction set of the High Speed Processor. The instructions are grouped by function (eg. ADD, SHIFT), and within these groups they are ordered by instruction format. The summary is given in the following form:

(MNEMONIC): Assembler mnemonic

Op: Hexadecimal op. K indicates 2-word instruction. Description block defines use of second word.

L/A: Indicates if instruction is logic or arithmetic mode dependent (dependent on bit 9 of status). Blank indicates instruction is independent of mode bit.

St: Indicates which bits of the status register are updated by the instruction.
Z = Zero
C = Carry
V = Overflow
T = Test Ctl: Indicates which bits of the status register effect execution of the instruction.

Func.: Basic function of operation.

Desc: Further description of operation, if required.
Especially note the IO (I/O space select) bit and the BM (Byte mode select) bit in the Ctl section. These bits affect the results of the execution of an instruction if the data bus (DB) is an instruction operand. Refer back to an earlier section of this paragraph for a detail description of the effects.

ADD INSTRUCTIONS. Add instructions perform 2's complement addition of 16-bit numbers, with one exception:

*During multiple precision operations, the carry out of a 16-bit sub-sum becomes a carry in to the next sub-sum. Status bits are not valid until the end of the operation.

3-REGISTER ADD. The two instructions are identical with respect to source operands, but differ in result destination.

Op: 2zyx    Ax = By + Az

TABLE II-continued
INSTRUCTION SUMMARY BY FUNCTION

Op: 6zyx    Bx = By + Az
L/A: Arith : St: ZCV    : Ctl:

Func: Add contents of two scratchpad registers, store result in a third register.

2-REGISTER ADD. The 2-register add instructions use registers for one operand and the result. The other operand is implied in the instruction.

Op:  04zy    Az = Ay + DB
     05zy    Bz = Ay + DB
     0Czy    Az = By + DB
     0Dzy    Bz = By + DB
L/A: Arith : St: ZCV    : Ctl: IO BM
Func: Add contents of a scratchpad registers and the data bus. Store the result in a second register.

Op:  44zy    Az = Ay + TR
     45zy    Bz = AY + TR
     4Czy    Az = By + TR
     4Dzy    Bz = By + TR
L/A: Arith : St.: ZCV : Ctl:
Func: Add contents of a scratchpad register and the temp reg. Store the result in a second register.

SINGLE-REGISTER ADD. Single-register add instructions use a single register in one operand. The destination is either the same register as the source operand or the temp register. The other operand is implied in the instruction.

Op:  00Cz    Az = Az + MDM
     00Dz    Az = Az + MDL
     08Cz    Bz = Bz + MDM
     08Dz    Bz = Bz + MDL
L/A: St: ZCV : Ctl:
Func: Add contents of a scratchpad register and a half of the multiply/divide register.

Op:  1A2z kkkk    Az = Az + kkkk
     1AAz kkkk    Bz = Bz + kkkk
L/A: Arith: St: ZCV: Ctl:
Func: Add contents of a scratchpad register to a 16-bit constant from the second word of the instruction.

Op:  017z    TR = Az + DB
     097z    TR = Bz + DB
L/A: Arith: St: ZCV: Ctl: IO BM
Func: Add contents of a scratchpad register and the data bus. Store the result in the T register.

IMPLICIT ADD. Implicit add instructions use the temp register as an operand and destination. The other operand is implied in the instruction.

Op:  1221    TR = TR + DB
L/A: St.: ZCV    Ctl: IO BM
Func: Add contents of the temp register to the DB and store the result in the temp. register.

Op:  122F    TR = TR + IC
L/A: St: ZCV: Ctl:
Func: Add contents of the temp register to the iteration counter and store the result in the temp register.

LOGICAL 'AND' INSTRUCTIONS. AND instructions perform bit-by-bit logical AND of corresponding bits in two 16-bit operands.

The Z status bit will be set if the result of the operation is zero. Otherwise the Z bit will be reset. The C and V status bits are reset.

3-REGISTER AND. The two instructions are identical with respect to source operands, but differ in result destination.

Op:  2zyx    Ax = By AND Az
     6ztx    Bx = By AND Az
L/A: Logic : St: ZCV : Ctl:
Func: AND contents of two scratchpad registers, store result in a third register.

TABLE II-continued
INSTRUCTION SUMMARY BY FUNCTION

2-REGISTER AND. The 2-register AND instructions use registers for one operand and the result. The other operand is implied in the instruction.

Op: 04zy    Az = Ay AND DB
     05zy    Bx = Ay AND DB
     0Czy    Az = By AND DB
     0Dzy    Bz = By AND DB

L/A: Logic: St: ZCV  Ctl: IO BM
Func: AND contents of a scratchpad registers and the data bus. Store the result in a second register.

44zy    Az = AY AND TR
     45zy    Bz = Ay AND TR
     4Czy    Az = By AND TR
     4Dzy    Bz = By AND TR

L/A: Logic: St: ZCV  Ctl:
Func: AND contents of a scratchpad register and the temp reg. Store the result in a second register.

SINGLE-REGISTER AND. Single-register AND instructions use a single register as one operand. The destination is either the same register as the source operand or the temp register. The other operand is implied in the instruction.

Op:    1A2z kkkk    Az = Az AND kkkk
     1AAz kkkk    Bz = Bz AND kkkk

L/A: Logic: St: ZCV  Ctl:
Func. AND contents of a scratchpad register to a 16-bit constant from the second word of the instruction.

Op:    017z    TR = Az AND DB
     097z    TR = Bz AND DB

L/A: Logic: St: ZCV  Ctl: IO BM
Func: Add content a of a scratchpad register and the data bus. Store the result in the T register.

BIT MANIPULATION INSTRUCTIONS. The bit manipulation instructions provide the means for setting, resetting, and testing individual bits in scratchpad and discrete processor registers.

SCRATCHPAD BIT INSTRUCTIONS.

Op:    14zy    SBIT Az(y)
     15zy    RBIT Az(y)
     1Czy    SBIT Bz(y)
     1Dzy    RBIT Bz(y)

L/A: st: Ctl:
Func: Set or Reset bit 'y' of the indicated scratchpad register.

Op:    16zy    TBIT Az (y)
     1Ezy    TBIT Bz (y)

L/A: St: T  Ctl:
Func: Test bit 'y' of the indicated scratchpad register. Copy the state of the tested bit to the T status bit.

Op:    118z    TR = SBIT(DB,z)
     119z    TR = SBIT(MARL,z)
     11Az    SBIT ST(z)
     11Bz    SBIT TR(z)
     11Cz    SBIT IC(z)
     11Dz    SBIT PTR(z)
     11Ez    SBIT MDM(z)
     11Fz    SBIT MDL(z)

198z    TR = RBIT(DB,z)
     199z    TR = RBIT(MARL,z)
     19Az    RBIT ST(z)
     19Bz    RBIT TR(z)
     19Cz    RBIT IC(z)
     19Dz    RBIT PTR(z)
     19Ez    RBIT MDM(z)
     19Fz    RBIT MDL(z)

L/A: St: Ctl: IO **
Func: Set or Reset bit 'a' of the indicated register.
Desc: For the case of DB and MARL, the indicated bit is set or reset and the result is put in the temp reg. DB or MARL are not changed.

Op:    190z    TBIT DB(z)

191z    TBIT MARL(z)
     192z    TBIT ST(z)
     193z    TBIT TR(z)
     194z    TBIT IC(z)
     195z    TBIT PTR(z)
     196z    TBIT MDM(z)
     197z    TBIT MDL(z)

L/A: St: T :Ctl: IO **
Func: test bit 'z' of the indicated register. Copy the state of the tested bit to the status reg T bit.

COMPARE INSTRUCTIONS. The comparison instructions perform a subtraction, discard the result, and update the status bits.

Op:    100z    DB − Az **
     101z    MARL − Az
     102z    ST − Az
     103z    TR − Az
     104z    IC − Az
     105z    PTR − Az
     106z    MDM − Az
     107z    MDL − Az

108z    DB − Bz
     109z    MARL − Bz
     10Az    ST − Bz
     10Bz    TR − Bz
     10Cz    IC − Bz
     10Dz    PTR − Bz
     10Ez    MDM − Bz
     10Fz    MDL − Bz

L/A: : St: ZCV  Ctl: IO BM **
Func: Peform a subtraction and update status bits.

INCREMENT AND DECREMENT INSTRUCTIONS. The increment and decrement instructions change the value of a 16-bit 2's complement integer by one.

SCRATCHPAD REGISTER INCREMENT AND DECREMENT.

Op:    004z    INC Az
     006z    DEC Az
     084z    INC Bz
     086z    DEC Bz

L/A: : St: ZCV : Ctl:
Func: Increment or decrement the addressed scratchpad register by one.

Op:    1206    INC A(IC)
     1207    INC B(IC)
     120E    DEC B(IC)
     120F    DEC B(IC)
     1216    INC A(PTR)
     1217    INC B(PTR)
     121E    DEC B(PTR)
     121F    DEC B(PTR)

L/A: : St: ZCV : Ctl:
Func: Increment or decrement the indirectly addressed scratchpad register by one.

MARL INCREMENT AND DECREMENT. The content of the addresses scratchpad register are copied to MARL. The register value is then incremented or decremented and written back to the scratchpad. The instructions also define BYTE or WORD state of the BM status bit.

Op:    008z    MARL = Az +, BYTE
     009z    MARL = Az+, WORD
     00Az    MARL = Az−, BYTE
     00Bz    MARL = Az−, WORD
     088z    MARL = Bz+, BYTE
     089z    MARL = Bz+, WORD
     08Az    MARL = Bz−, BYTE
     08Bz    MARL = Bz−, WORD

L/A: : St: ZCV, BM : Ctl:
Func: Increment or decrement MARL and also the scratchpad operand register by one.

MARM INCREMENT AND DECREMENT. The MARM increment and decrement instructions are used in the maintenance of the 32-bit data memory address space. In most applications,

TABLE II-continued
INSTRUCTION SUMMARY BY FUNCTION the instruction immediately preceeding this instruction will
be a bump of MARL, which copies the state of the adder carry
to the C bit in the status register. These instructions add
(or subtract) zero and carry bit. Thus, if there was a carry
(or borrow) out during the MARL instruction, MARM
will also be bumped. These instructions also copy the result
back to the scratchpad operand register.

Op:    005z    MARM = Az + 0
       007z    MARM = Az − 0
       085z    MARM = Bz + 0
       087z    MARM = Bz − 0
L/A: : St: ZCV Ctl:
Func: Increment or decrement MARM and also the scratchpad
operand register by one.

SINGLE-REGISTER SUBTRACT. Single-register subtract
instructions use a single register as one operand destination
is either the same register as the source operand the temp
register. The other operand is implied in instruction.

Op:    00Ez    Az = Az − MDM
       00Fz    Az = Az − MDL
       08Ez    Bz = Bz − MDM
       08Fz    Bz = Bz − MDL
L/A: St: ZCV : Ctl:

Func: Subtract contents of half the multiply/divide register from a
scratch pad register.

Op:    1A3z kkkk    Az = kkkk − Az
       1ABz kkkk    Bz = kkkk − Bz

L/A: Arith: St: ZCV : Ctl:

Func: Subtract contents of a scratchpad register from a 16-bit
constant in a second word of the instruction.

IMPLICIT SUBTRACT. The implicit register subtract instruction
uses the temp register as an operand and destination.
The other operand is implied in the instruction.

Op:    1223    TR = TR − DB
L/A: : St: ZCV : Ctl: 10 BM
Func: Subtract the DB for the content of the temp reg and store the
result in the temp register.

'XOR' INSTRUCTIONS. XOR instructions performs a bit-by-bit
XOR of corresponding bits in two 16-bit operands.

The Z status bit will be set if the result of the operation is
zero. Otherwise the Z bit will be reset. The C and V status
bits are reset.
3-REGISTER 'XOR'

Op:    5zyx    Bx = By XOR Az
L/A: Logic: St: ZCV Ctl:
third register.

2-REGISTER 'XOR'. The 2-register XOR instructions use
registers for one operand and the result. The other operand
is implied in the instruction.

Op:    06zy    Az = DB XOR Ay
       07zy    Bz = DB XOR Ay
       0Ezy    Az = DB XOR By
       0Fzy    Bz = DB XOR By
L/A: Logic St: ZCV Ctl: 10 BM
Func: XOR contents of a scratchpad register and the data
bus. Store the result in a second register.
Op:    46zy    Az = Ay XOR TR
       47zy    Bz = Ay XOR TR
       4Ezy    Az = By XOR TR
       4Fzy    Bz = By XOR TR L/A: Logic St: ZCV Ctl:
Func: XOR contents of a scratchpad registers and the temp
reg. Store the result in a second register.

UNCLASSIFIED INSTRUCTIONS
Op:    1243    TRAP

L/A: St: Ctl:
Func: Perform a trap to dedicated location ????
The trap is executed in the same manner as a subroutine call.

Op:    1235    DISINT
L/A: St: Ctl:
Func: Disable the external interrupt pin from causing an
interrupt.

TABLE III
HSP PIN ASSIGNMENTS

The High Speed Processor, in the embodiment of Figures 1 and 2, is an
84 pin devoce. Details of physical pin mencing are to
be determined.
HSP PIN DESCRIPTION

| SIGNAL | PIN | I/O | DESCRIPTION |
|---|---|---|---|
| | | | Power and ancillary functions |
| Vcc | 1 | IN | Supply voltage ( +5V nominal) |
| Vcc2 | 2 | IN | Supply voltage ( +5V nominal) |
| Vss | 3 | IN | Ground voltage |
| CAP | 4 | | Substrate capacitor. A .1uF capacitor should be connected between this pin and ground. |
| IAS | 6 | OUT | Instruction Address strobe. When asserted the instruction memory address on PCA (15 to 0) is valid. The processor is com-commencing a write or read cycle to the instruction memory. The data is transferred on bus IW(15 to 0) on a read cycle and bus (15 to )) on a write cycle. |
| ITACK | 7 | IN | Instruction memory transfer acknowledge Asserted by the instruction memory when either valid read data is available or the write cycle is complete. |
| PCA15 | x | OUT | Program counter address |
| PCA14 | x | OUT | PCA 15(msb) through to |
| PCA13 | x | OUT | PCA0(lsb). This bus is permanent- |
| PCA12 | x | OUT | ly active. This bus is used to |
| PCA11 | x | OUT | address the memory space that |
| PCA10 | x | OUT | contains the processor instructions. |
| PCA9 | x | OUT | |
| PCA8 | x | OUT | |
| PCA7 | x | OUT | |
| PCA6 | x | OUT | |
| PCA5 | x | OUT | |
| PCA4 | x | OUT | |
| PCA3 | x | OUT | |
| PCA2 | x | OUT | |
| PCA1 | x | OUT | |
| PCA0 | x | OUT | |
| IW15 | x | IN | Instruction memory data bus IW15 |
| IW14 | x | IN | (msb) to IW0(lsb). On a read cycle, |
| IW13 | x | IN | the instruction word is read through |
| IW12 | x | IN | this bus. |
| IW11 | x | IN | |
| IW10 | x | IN | |
| IW9 | x | IN | |
| IW8 | x | IN | |
| IW7 | x | IN | |
| IW6 | x | IN | |
| IW5 | x - | IN | |
| IW4 | x | IN | |
| IW3 | x | IN | |
| IW2 | x | IN | |
| IW1 | x | IN | |
| IW0 | x | IN | |
| | | | Data Memory (These signals are tristated when BUSY/ is not asserted) |
| IO/MEM | 8 | | IO, Memory. This signal selects between the 64K byte I/O space and 8 Gbyte memory space available in the data memory address space. |
| AS | 9 | OUT | Address strobe. When asserted, the |

TABLE III-continued
HSP PIN ASSIGNMENTS

| | | | |
|---|---|---|---|
| R/W | 10 | | address on bus MA15(msb) to MA0(lsb) is valid and a write or read cycle is in progress. Read/Write. Asserted at the same time as AS/ and indicates the direction of the data transfer. |
| UDS | 11 | OUT | Upper and Lower Data strobes. The and Lower Data strobes are asserted to indicate that the most and least bytes, respectively of the data memory are to be written or read. In the write cycle UDS/ and LDS/ are delayed to allow this signal to be used to gate WE/ onto static RAMS. |
| LDS | 12 | OUT | |
| HIMA/IW | 13 | OUT | High order Mem. Address, Instruction write. If asserted while AS/ is negated then the processor is presenting address bits bits MA31(msb) to MA16(lsb) on the address lines MA15(msb) to MA0(lsb). This extended address should be externally latched. If HIMA/IW/ is asserted while AS/ is asserted, then the data word from the data memory space is being transferred to the instruction memory space on the bus D(15 to 0). This signal is used to determine whether an instruction memory cycle is write or read. |
| DTACK | 14 | IN | Data Transfer Acknowledge. The peripheral or memory at address MA(15 to 0) or memory responds to AS/ by asserting DTACK/ when either valid read data is available or the write cycle is complete DTACK/ should not be negated until either AS/, UDS/ or LDS have been negated. |
| MA15 | x | OUT | Data memory address bus MA15(msb) through to MA0(lbs). This bus is used to address the 8 Gbyte date memory space. The extended memory address, MA32 to MA17 is also loaded into its external latch when HIMA is asserted. |
| MA14 | x | OUT | |
| MA13 | x | OUT | |
| MA12 | x | OUT | |
| MA11 | x | OUT | |
| MA10 | x | OUT | |
| MA9 | x | OUT | |
| MA8 | x | OUT | |
| MA7 | x | OUT | |
| MA6 | x | OUT | |
| MA5 | x | OUT | |
| MA4 | x | OUT | |
| MA3 | x | OUT | |
| MA2 | x | OUT | |
| MA1 | x | OUT | |
| MA0 | x | OUT | |
| D15 | | I/O | Data memory data bus D15 (msb) to D0(lsb). Data is transferred to and from the memory on this bidirectional bus. Data to be written into the instruction memory is also transferred on this bus. |
| D14 | | I/O | |
| D13 | | I/O | |
| D12 | | I/O | |
| D11 | | I/O | |
| D10 | | I/O | |
| D9 | | I/O | |
| D8 | | I/O | |
| D7 | | I/O | |
| D6 | | I/O | |
| D5 | | I/O | |
| D4 | | I/O | |
| D3 | | I/O | |
| D2 | | I/O | |
| D1 | | I/O | |
| D0 | | I/O | |
| | | | Interrupts |
| RESET /TEST | 15 | IN | Reset/Test is a multi-cunction input. When active low, the control go to their inactive stat, the program counter is cleared. When Reset/Test is taken above 15v, the processor operates in a test mode for test purposes. |
| INTA | 16 | IN | Interrupt A and Interrupt B. These two lines are multiplexed to provide two maskable interrupts and one non-maskable interrupt (NMI). INTA may also be tested directly using a single instruction. Bus Arbitration |
| INTB | 17 | IN | |
| REQ | 18 | OUT | Request. REQ/ is asserted by the processor when it is waiting to access the data memory address space. REQ/ is negated when GR/REL/ is asserted. |
| GR/REL | 19 | IN | Grant/Release. If Grant/Release is asserted while REQ/ is asserted then the processor will become bus master for the data memory address If Grant/Release is asserted while Busy busy is asserted, the processor will relinquish control of the data memory address space at some convenient time and negate Busy. |
| BUSY | 20 | OUT | Busy. Busy indicates to other potential bus masters that this processor is bus master. Busy is asserted before its tristated data memory bus drivers are enable. Busy is negated after the bus drivers have been disabled. |

Note 1. The above bus arbitration control pins are used to control access to part or all of the data memory address space. The instruction memory address space is totally unaffected.

MARL TO TR INCREMENT AND DECREMENT.

Op:  1220      TR = MARL + 1
     1222      TR = MARL − 1

L/A: : St: ZCV : Ctl:
Func: Increment or decrement the content of MARL and put the result in the temp register The content of MARL is not changed.

REGISTER INCREMENT AND DECREMENT.

Op:  1224      INC IC
     1225      INC PTR
     1226      DEC IC
     1227      DEC PTR

L/A: St: ZCV  Ctl:
Func: Increment or decrement IC or PTR.

MOVE INSTRUCTIONS.
The move instructions copy an operand from one location to another.

SCRATCH PAD TO SCRATCHPAD MOVE. These instructions copy the content on one scratchpad register to another.

Op:  40zy      Az = Ay
     41zy      Bz = Ay
     48zy      Az = By
     49zy      Bz = By

L/A: : St: ZCV : Ctl:
Func: Copy operand to destination. Note that status is updated.

Op:  014z      A(IC) = Az
     015z      B(IC) = Az
     094z      A(IC) = Bz
     095z      B(IC) = Bz

L/A: : St: : Ctl:
Func: Copy operand to destination indirect by IC.

Op:  1A4z      Az = A(IC)
     1A5z      Az = A(IC)
     1ACz      Bz = A(IC)
     1ADz      Bz = B(IC)

L/A: : St: : Ctl:
Func: Copy operand indirect by IC to destination.

DISCRETE REGISTER TO SCRATCHPAD MOVE. These instructions move the content of a discrete processor register to a scratchpad register. Note that if the source operand is PTR, the upper 8 bits of the 16-bit operand is zero.

Op:  180z      Az = DB **

TABLE III-continued
HSP PIN ASSIGNMENTS

| | 181z | Az = MARL |
|---|---|---|
| | 182z | Az = ST |
| | 183z | Az = TR |
| | 184z | Az − IC |
| | 185z | Ax = PTR |
| | 186z | Az = MDM |
| | 187z | Az = MDL |
| | 188z | Bz = DB |
| | 189z | Bz = MARL |
| | 18Az | Bz = ST |
| | 18Bz | Bz = TR |
| | 18Cz | Bz = IC |
| | 18Dz | Bz = PTR |
| | 18Ez | Bz = MDM |
| | 18Fz | Bz = MDL |
| | 1A6z | Az = MARM |
| | 1AEz | Bz = MARM |

L/A: St: Ctl: IO BM **
Func: Copy discrete register to scratchpad register

Desc: Control bit dependencies are only for instructions marked with '**'

| Op: | 120C | A(IC) = TR |
|---|---|---|
| | 120D | B(IC) = TR |
| | 121C | A(PTR) = TR |
| | 121D | B(PTR) = TR |

L/A: St: Ctl:
Func: Copy TR indirect to scratchpad register.

| Op: | 1208 | A(IC) = IW(TR) |
|---|---|---|
| | 1209 | B(IC) = IW(TR) |
| | 1218 | A(PTR) = IW(TR) |
| | 1218 | B(PTR) = IW(TR) |

L/A: St: Ctl:
Func: Copy the instruction memory word addressed indirectly by the temp register to an indirectly addressed location in scratchpad. Also load TR with the addressed IW.

| Op: | 1A0z | Az = IW(TR) |
|---|---|---|
| | 1A8z | Bz = IW(TR) |

L/A: St: Ctl:
Func: Copy the instruction memory word addressed indirectly by the temp register to a scratchpad register. Also load TR with the addressed IW.

LOAD SCRATCHPAD WITH CONSTANT INSRTUCTIONS.
These instructions load a scratchpad register with a constant.

| Op: | 1A1z kkkk | Az = kkkk |
|---|---|---|
| | 1A9z kkkk | Bz = kkkk |

L/A: St: Ctl:
Func: Copy the second 16-bit word of the instruction to a scratchpad register.

| Op: | 120A kkkk | A(IC) = kkkk |
|---|---|---|
| | 120B kkkk | B(IC) = kkkk |
| | 121A kkkk | A(PTR) = kkkk |
| | 121B kkkk | B(PTR) = kkkk |

L/A: St: Ctl:
Func: Copy the second 16-bit word of the instruction to an indirectly addressed location in scratchpad.

SCRATCHPAD TO DISCRETE REGISTER MOVE. These instructions move the content of a scratchpad register to a discrete processor register. There are exceptions to the general case:

* If the destination is the external data bus, the destination will be either an I/O register or a data memory location, dependent upon the state of the IO status bit. If the BM bit is in the BYTE mode, the operand is the lower byte of the scratchpad register.

* If the destination is MARL, either MARL or the I/O address register will be loaded externally, dependent upon the state of the IO status bit.

* If the destination is MARM, bit 15 of MARM (sign) will also be copied into the spillover register. The MD fault bit will also be cleared.

| Op: | 016z | MEM = Az ** |
|---|---|---|
| | 018z | MARM = Az ** |
| | 019z | MARL = Az |
| | 01Az | ST = Az |
| | 01Bz | TR = Az |
| | 01Cz | IC = Az |
| | 01Dz | PTR = Az |
| | 01Ez | MDM = Az |
| | 01Fz | MDL = Az |
| | 096z | MEM = Bz ** |
| | 098z | MARM = Bz ** |
| | 099z | MARL = Bz |
| | 09Az | ST = Bz |
| | 09Bz | TR = Bz |
| | 09Cz | IC = Bz |
| | 09Dz | PTR = Bz |
| | 09Ez | MDM = Bz |
| | 09Fz | MDL = Bz |

L/A: St: Ctl: IO BM **
Func: Copy the content of the addressed scratchpad register to the indicated discrete register.

Desc: Control bit dependencies are only for instructions marked with '**'.

| Op: | 1202 | TR = A(IC) |
|---|---|---|
| | 1203 | TR = B(IC) |
| | 1212 | TR = A(PTR) |
| | 1213 | TR = B(PTR) |

L/A: St: Ctl:
Func: Copy the content of the indirectly addressed scratchpad register to the temp register.

| Op: | 010z | TRL = Az |
|---|---|---|
| | 011z | TRM = Az |
| | 090z | TRL = Bz |
| | 091z | TRM = Bz |

L/A: St: Ctl:
Func: Copy the Lower or Upper byte of an addressed scratchpad register to the corresponding corresponding byte of temp reg.

| Op: | 012z | IT1 = Az |
|---|---|---|
| | 013z | IT2 = Az |
| | 092z | IT1 = Bz |
| | 093z | IT2 = Bz |

L/A: Ct: Ctl:
Func: Copy the content of the addressed scratchpad register to interval timer 1 or 2.

LOAD REGISTER WITH CONSTANT INSTRUCTIONS. These instructions load registers with 4- or 8-bit constants in a single-word instruction or with the second word of 2-word instructions.

| Op: | 1238 kkkk | MARL = kkkk |
|---|---|---|
| | 1239 kkkk | IC = kkkk |
| | 123A kkkk | MARM = kkkk |
| | 123B kkkk | PTR = kkkk |

L/A: St: Ctl:
Func: Load the indicated register with the 16-bit constant from the second instruction word.

| Op: | 13kk | TRM = kk |
|---|---|---|
| | 1Bkk | TRL = kk |

L/A: St: Ctl:
Func: Load the More or Less significant half of the temp register with an 8-bit constant.

| Op: | 126k | PREC = k |
|---|---|---|
| | 127k | PAGE = k ** |

L/A: St: PAGE ** Ctl:
Func: load the instruction speed, multiprecision, or scratchpad page register with a 4-bit constant.

UNCLASSIFIED MOVE INSTRUCTIONS. These instructions

TABLE III-continued
HSP PIN ASSIGNMENTS perform data movements between various registers.

Op: 1237  SWAP TRM, TRL
L/A: St: Ctl:
Func: Exchange bytes in the temp register.

Op: 1228  MARL = DB
    1229  IC = DB
    122D  TR = DB
L/A: St: Ctl: IO BM
Func: Load the indicated register from the data bus.

Op: 122A  MARL = TR
    122C  TR = MARL
L/A: St: Ctl:
Func: Move data between MARL and the temp register.

Op: 122E  TR = 0
L/A: St: Ctl:
Func: Clear the temp register.

Op: 122B  MEM = TR
L/A: St: Ctl: IO BM
Func: Copy the content of the temp reg to the data bus.
Desc: The destination is either an I/O register or data memory. If the BM bit indicates BYTE mode, the operand is the lower byte of the temp register.

Op: 122B  IW(TR) = DB
L/A: St: Ctl:
Func: Copy the content of the data bus indirect through the temp register to the instruction memory.

MULTIPLY/DIVIDE INSTRUCTIONS. All multiply instructions use the MDM/MDL registers as destination and the divide instructions use them as dividend source. All operations are effected by the Signed Multiply (SM) status bit. When the bit is set, operands and result are handled as 2's complement integers. If the bit is not set, they are handled as unsigned numbers. If an overflow occurs or if division by zero is attempted, the MD status bit will be set.

MULTIPLY INSTRUCTIONS These instructions perform simple multiplication.

Op: 17zy  Az * By
L/A: St: MD  Ctl: SM
Func: Multiply the two scratchpad operands and store the result in MDM/MDL.

Op: 128z  Az * DB
    12Cz  Bz * DB
L/A: St: MD  Ctl: SM IO BM
Func: Multiply scratchpad operand by DB content and store result in MDM/MDL.

MULTIPLY AND ACCUMULATE INSTRUCTIONS. These instructions multiply the two operands, add to the current content of MDM/MDL, and store the result back in MDM/MDL.

Op: 1Fzy  Az * + By
L/A: St: MD  Ctl: SM
Func: Multiply the two scratchpad operands and accumulate into MDM/MDL.

Op: 129x  Az * + DB
    12Dz  Bz * + DB
L/A: St: MD  Ctl: SM IO BM
Func: Multiply scratchpad operand by DB content and accumulate intp MDM/MDL.

OpL: 1204  A(IC) * + DB
     1205  B(IC) * + DB
     1214  A(PTR) + DB
     1215  B(PTR) * + DB
L/A: St: MD  Ctl: SM IO BM
Func: Multiply the indirectly addressed scratchpad operand bvy the content of DB and accumulate into MDM/MDL.

DIVIDE INSTRUCTIONS

Op: 12Az  MD / Az
    12Ez  MD / Bz
L/A: St: MD  Ctl: SM
Func: Divide MDM/MDL by the scratchpad operand. Store the quotient in MDL and the remainder in MDM.

LOGICAL 'OR' INSTRUCTIONS. OR instructions performs a bit-by bit OR of corresponding bits in two 16-bit operands.

The Z status bit will be set if the result of the operation is zero. Otherwise the Z bit will be reset. The C and V status bits are reset.

3-REGISTER 'OR' The two instructions are identical with respect to source operands, operands, but differ in result destination.

Op: 3zyx  Ax = Az OR By
    7zyx  Bx = Az OR By
L/A: Logic  St: ZCV  Ctl:
Func: OR contents of two scratchpad registers, store in a third register.

2-REGISTER 'OR' The 2-register OR instructions use registers for one operand and the result. The other operand is implied in the instruction.

Op: 02zy  Az = Ay OR DB
    03zy  Bz = Ay OR DB
    0Azy  Az = By OR DB
    0Bzy  Bz = OR DB
L/A: Logic  St: ZCV  Ctl: IO BM
Func: OR contents of a scratchpad register and the data bus. Store the results in a second register.

Op: 42zy  Az = Ay OR TR
    43zy  Bz = Ay OR TR
    4Azy  Az = By OR TR
    4Bzy  Bz = By OR TR
L/A: Logic  St: ZCV  Ctl:
Func: OR contents of a scratchpad register and the temp reg. Store the result in a second register.

SINGLE-REGISTER 'OR' . Single-register OR instructions use a single register as one operand. The destination is the same register as the source operand. The other operand is implied in the instruction.

Op: 1A3z kkkk  Az = OR kkkk
    1ABz kkkk  Bz = Bz OR kkkk
L/A: Logic  St: ZCV  Ctl:
Func: OR contents of a scratchpad register with a 16-bit from the second word of the instruction.

PROGRAM CONTROL INSTRUCTIONS. The program control instructions modify the sequence of instruction executed by loading a value into the program counter.

SUBROUTINE CALL INSTRUCTIONS. The pointer is incremented and the current content of the PC and ST registers are pushed onto a stack in the scratchpad, at the location defined by the PTR. The PC value is loaded into scratchpad A, and the status is loaded into scratchpad B. The PC is loaded from the indicated source and instruction execution continues from the new PC address.

Op: 1230  JUMPSUB TR
L/A: St: Ctl:
Func: Perform a subroutine call to the location in TR.

Op: 1231 zzzz  GOSUB zzzz
L/A: St: Ctl:
Func: Perform a subroutine call to the address defined by the second word of the instruction.

Op: Bddd  SGOSUB ddd
L/A: St: Ctl:
Func: Perform a subroutine call. The lower 12 bits of the instruction are treated as a 2's complement displacement, which is added to the current value of the PC to become the target address.

SUBROUTINE RETURN INSTRUCTIONS. The value in scratchpad A indirectly addressed by the pointer is loaded into the program counter. The return with stauts instruction copies

TABLE III-continued
HSP PIN ASSIGNMENTS the value in scratchpad B into the status register. Following the read of the scratchpads, the pointer is decremented. Instruction execution continues from the value loaded into the PC.

Op: 1232 RETURN
L/A: St: Ctl:
Func: Perform a subroutine return without restoring ST.

Op: 1233 RETURNST
L/A: St: All bits Ctl:
Func: Perform a subroutine return and restore ST.

16-BIT BRANCH INSTRUCTION. This instruction allows a branch to any location in the 64K word address space.

Op: 1234 JUMP TR
L/A: St: Ctl:
Func: Perform a jump to the location in the temp reg.

12-BIT BANCH INSTRUCTION. These instructions treat the lower 12 bits of the instruction as a 2's complement displacement, which is added to the current value of the PC to become the target address.

Op: 8ddd BRANCH ddd
L/A: St: Ctl:
Func: Perform an unconditional jump relative to the current value of the PC.

Op: 9ddd BRDIC ddd
L/A: St: Ctl:
Func: Decrement the IC. If the result is zero, perform a jump relative to the current value of the PC. If the result is non-zero, continue from the current PC.

Op: Addd BRPER ddd
L/A: St: Ctl:
Func: Test the external peripheral test pin. If asserted, perform a jump relative to the current value of the PC. Otherwise, continue from the current PC.

10-BIT BRANCH INSTRUCTIONS. All the 10-bit branch instructions are conditional upon a test. Each branch can be indicated by the test result being either true (status bit asserted) or false (status bit not asserted). If taken, the branch is relative to the current value of the PC.

```
Op:     C0dd        BZ dd
        C4dd        BC dd
        C8dd        BT dd
        CCdd        BMD dd
        D0dd        BV dd
```
L/A: St: Ctl:
Func: Perform a relative branch if the corresponding status bit is set.

```
Op:     E0dd        BNZ dd
        E4dd        BNC dd
        E8dd        BNT dd
        ECdd        BNMD dd
        F0dd        BNV dd
```
L/A: St: Ctl:
Func: Perform a relative branch if the corresponding status bit is not set.

```
Op:     D4dd        BZAIC dd
        F4dd        BFZAIC dd
```
L/A: St: ZCV CTl:
Func: BZAIC: Test the Z bit and decrement the IC. If Z is set and IC = 0, then perform a relative branch. Update status based on the decrement of IC.
BFZAIC: Inverse of BZAIC

```
        D8dd        BCAIC dd
        F8dd        BFAIC dd
```
L/A: St: ZCV Ctl:
Func: BZAIC: Test the C bit and decrement the IC. If C is set and IC = 0, then perform a relative branch. Update status based on the decrement of IC.

BFCAIC: Inverse of BCAIC.
Op: DCdd BZC dd

TABLE III-continued
HSP PIN ASSIGNMENTS

```
        FCdd        BFZC dd
L/A: St: Ctl:
Func:   BZC:        Perform a relative branch if the Z or
                    C bit is set.
        BFZC:       Inverse of BZC
```

SHIFT INSTRUCTIONS. The shift instructions shift an operand by one bit position The bit shifted out is loaded into the carry bit so it may be tested or for use in a multiple precision shift operation. In multiple a precision shift, the bit which normally would be vacated is instead loaded from the carry bit, which in turn was loaded on the previous instruction.

A 16-bit shift of MDM/MDL is also provided.

LOGICAL SCRATCHPAD REGISTER SHIFTS.
Op: 002z SRL Az
    082z SRL Bz
L/A: Logic: St: ZCV : Ctl:
Func: Perform a right shift of a scratchpad register, and set the C status bit equal to the bit shifted from the register.

Desc: The Z status bit is set if the shifted result is zero. A zero is loaded into bit 15, unless a multiple precision shift is being performed. In that case, 85 the C status bit is shifted into the position.

Op: 003z SLC Az
    083z SLC Bz
L/A: Logic : St: ZCV : Ctl:
Func: Perform a left shift of the operand and copy the bit shifted out of the operand (bit 15) into the vacated position (bit 00). Copy the shifted bit to the C status bit. The Z status bit is set if the operand is zero.

ARITHMETIC SCRATCHPAD REGISTER SHIFTS.

Op: 002z SRA Az
    082z SRA Bz
L/A: Arith : St: ZCV : Ctl:
FUNC: Perform a right shift of a scratchpad register, and set the C status bit equal to the bit shifted from the register.

DESC: The Z status but is set to zero if the shifted result is zero, and the V bit is reset. The value of the sign prior to the shift (bit 15) is copied back into bit 15.

Op: 003z SLA Az
    083z SLA Bz
L/A: Arith : St: ZCV : Ctl:
FUNC; Perform a left shift of the scratchpad register, and set the C status bit equal to the bit shifted from the register. Set bit 00 to zero.

DESC: The Z status bit is set to zero if the shifted result is zero. The V bit is set if the shift caused the state of the sign (bit 15) to change.

MULTIPLY/DIVIDE REGISTER SHIFTS

Op: 123C SL MDM
    123D SL MDL
    123E SR MDM
    123F SR MDL
L/A: Logic : St: ZCV : Ctl:
Func: Perform a logical shift of the indicated operand and set the C status bit equal to the bit shifted from the register.

Desc: The vacated bit position is set to zero. The Z status bit is set if the shifted result is zero.

Op: 123C SL MDM
    123D SL MDL
L/A : Arith : St: ZCV : Ctl:

Func: Perform an arithmetic shift of the indicated operand and set the C status bit equal to the bit shifted from the register.

Desc: The vacated bit position is set to zero. The Z status bit is set if the shifted result is zero. The V bit is set if the shift caused the state of the sign (bit 15) to change.

Op: 123E SR MDM
    123F SR MDL

TABLE III-continued
HSP PIN ASSIGNMENTS

L/A: Arith: St: ZCV : Ctl:
Func: Perform an arithmetic shift of the indicated operand and set the C status bit equal to the bit shifted from the register.

Desc: The Z status bit is set to zero if the shifted result is zero, and the V bit is reset. The value of the sign prior to the shift (bit 15) is copied back into bit 15.
Op:     1236        SR MD, 16
L/A :  : St:  : Ctl:
Func: Shift SPILLOVER/MDM/MDL right arithmetically by 16.

SUBTRACT INSTRUCTIONS. Subtract instructions performs 2's complement subtraction of 16-bit numbers, with one exception:
* During multiple precision operations, the carry out of a 16-bit sub-difference becomes a carry in to the next sub-difference. Status bits are not valid until the end of the operation.

3-REGISTER SUBTRACT. The two instructions are identical with respect to source operands, but differ in result destination.

Op:   3zyx        Ax = Az − By
      5zyx        Bx = By − Az
      7zyx        Bz = Az − By
L/A: Arith : St: ZCV : Ctl:
Func: Subtract contents of two scratchpad registers, store result in a third register.

2-REGISTER SUBTRACT. The 2-register subtract instructions use registers for one operand and the result. The other operand is implied in the instruction.

Op:   02zy        Az = Ay − DB
      03zy        Bz = Ay − DB
      06zy        Az = DB − Ay
      07zy        Bz = DB − Ay
      0Azy        Az = By − DB
      0Bzy        Bz = By − DB
      0Ezy        Az = DB − By
      0Fzy        Bz = DB − By
L/A: Arith : St: ZCV   CTl: 10 BM Func: Subtract contents of a scratchpad register and the data bus. Store the result in a second register.

Op:   42zy        Az = Ay − TR
      43zy        Bz = Ay − TR
      46zy        AZ = TR − Ay
      47zy        Bz = TR − Ay
      4Azy        Az = By − TR
      4Bzy        Bz = By − TR
      4Ezy        Az = TR − By
      4Fzy        Bz = TR − By
L/A: Arith: St: ZCV : Ctl:
Func: Subtract contents of a scratchpad registers and the temp reg. Store the result in a second register.

I claim:

1. An asynchronous high speed processor system comprising: high speed processor means for executing each program instruction in a single fetch cycle; an instruction means for communicating instructions to the high speed processor means; a data memory for communicating data to the high speed processor means; the high speed processor means includes: an arithmetic logic unit (ALU) for performing arithmetic and logic operations upon the data provided by the data memory means under control of instructions from the instruction memory means, said arithmetic logic unit (ALU) requires two operands for operation in a single fetch cycle, the high speed processor means further includes; first memory means connected to said ALU so as to communicate the first operand, and second memory means connected to said ALU so as to communicate the second operand; and means for prefetching an instruction from the instruction memory means for an operation of the arithmetic logic unit upon data provided by the data memory means and wherein the means for prefetching comprises a memory having a plurality of stages for decoding the prefectched instruction and said memory further includes a domino circuit means responsive to a signal from the high speed processor means for providing a plurality of completion pulses indicating the availability of the prefecteched instruction for use by said ALU with each single completion pulse representative of the maximum signal propagation time delay through a predetermined single stage of the memory.

2. The system according to claim 1 wherein the data memory means comprises a plurality of stages and includes a domino circuit means responsive to a signal from the ALU for providing a plurality of completion pulses with each single completion pulse representative of the maximum signal propagation time delay through a predetermined single stage of the data memory means.

3. The system according to claim 1 wherein the first and second memory means each comprises a plurality of stages and includes a domino circuit means responsive to a signal from the ALU for providing a plurality of completion pulses indicating the completion of read and write memroy operations to the ALU with each single completion pulse representative of the maximum signal propagation time delay through a predetermined single stage of the each single memory means of the first and second memory means.

* * * * *